United States Patent
Liang et al.

(10) Patent No.: US 12,478,643 B2
(45) Date of Patent: Nov. 25, 2025

(54) COMPOSITIONS AND METHODS FOR THE PREVENTION OR TREATMENT OF RHEUMATOID ARTHRITIS

(71) Applicant: Rhode Island Hospital, Providence, RI (US)

(72) Inventors: Olin Liang, Chestnut Hill, MA (US); Eui-Young So, East Greenwich, RI (US); Anthony Reginato, West Roxbury, MA (US)

(73) Assignee: Rhode Island Hospital, Providence, RI (US)

( * ) Notice: Subject to any disclaimer, the term of this patent is extended or adjusted under 35 U.S.C. 154(b) by 0 days.

(21) Appl. No.: 18/285,649

(22) PCT Filed: Apr. 4, 2022

(86) PCT No.: PCT/US2022/023324
§ 371 (c)(1),
(2) Date: Oct. 4, 2023

(87) PCT Pub. No.: WO2022/216615
PCT Pub. Date: Oct. 13, 2022

(65) Prior Publication Data
US 2024/0197775 A1 Jun. 20, 2024

Related U.S. Application Data

(60) Provisional application No. 63/170,667, filed on Apr. 5, 2021.

(51) Int. Cl.
*A61K 35/15* (2025.01)
*A61K 40/10* (2025.01)
*A61K 40/22* (2025.01)
*A61K 40/41* (2025.01)
*A61P 19/02* (2006.01)
*C12N 5/078* (2010.01)

(52) U.S. Cl.
CPC ............. *A61K 35/15* (2013.01); *A61K 40/10* (2025.01); *A61K 40/22* (2025.01); *A61K 40/416* (2025.01); *A61P 19/02* (2018.01); *C12N 5/0634* (2013.01); *A61K 2239/31* (2023.05); *A61K 2239/38* (2023.05)

(58) Field of Classification Search
CPC .............................. A61K 35/15; A61P 19/02
See application file for complete search history.

(56) References Cited

U.S. PATENT DOCUMENTS

2012/0178725 A1   7/2012 Kerr
2018/0214483 A1   8/2018 Blazar et al.

FOREIGN PATENT DOCUMENTS

| WO | WO-2007082177 A2 * | 7/2007 | ............. A61K 35/28 |
|---|---|---|---|
| WO | 2010045199 A2 | 4/2010 | |
| WO | WO-2010086679 A1 * | 8/2010 | ............. A61K 35/28 |
| WO | 2019234189 A1 | 12/2019 | |

OTHER PUBLICATIONS

Kerr et al., Biochemical Society Transactions, 2020, 48:291-300.*
Ramapo et al., Frontiers in Medicine, 2021, 8, 689698:1-20.*
Zhang et al., Inflammation, 2014, 37(3): 670-7.*
Seladi-Schulman, Medical News Today, 2023.*
Freshney, Culture of Animal Cells, A Manual of Basic Technique, Alan R. Liss, Inc., 1983, New York.*
"International Search Report and Written Opinion received for PCT Patent Application No. PCT/US2022/023324, mailed on Jun. 30, 2022", 7 pages.
Aaltonen , et al., "Systematic Review and Meta-Analysis of the Efficacy and Safety of Existing TNF Blocking Agents in Treatment of Rheumatoid Arthritis", PLoS One, vol. 7, No. 1, e30275, Jan. 2012, 14 pages.
Alamanos , et al., "Epidemiology of Adult Rheumatoid Arthritis", Autoimmunity Reviews, vol. 4, 2005, pp. 130-136.
Alamanos , et al., "Incidence and Prevalence of Rheumatoid Arthritis, Based on the 1987 American College of Rheumatology Criteria: A Systematic Review", Seminars in Arthritis and Rheumatism, vol. 36, Issue 3, 2006, pp. 182-188.
Aletaha , et al., "2010 Rheumatoid Arthritis Classification criteria: an American College of Rheumatology/European League Against Rheumatism Collaborative Initiative", Annals of the Rheumatic Diseases, vol. 69, No. 10, 2010, pp. 1580-1588.
Birnbaum , et al., "Societal cost of rheumatoid arthritis patients in the US", Current Medical Research and Opinion, vol. 26, No. 1, 2010, pp. 77-90.
Boissier , et al., "Rheumatoid Arthritis: From Autoimmunity to Synovitis and Joint Destruction", Journal of Autoimmunity, vol. 39, 2012, pp. 222-228.
Dadouna , et al., "Mortality in Rheumatoid Arthritis Over the Last Fifty Years: Systematic Review and Meta-Analysis", Joint Bone Spine, vol. 80, Issue 1, 2013, pp. 29-33.
Dougados , et al., "Baricitinib in patients with inadequate response or intolerance to conventional synthetic DMARDs: results from the RA-Build study", Ann Rheum Dis., vol. 76, 2017, pp. 88-95.
Gu , et al., "Comparing Biologic Cost Per Treated Patient Across Indications Among Adult US Managed Care Patients: A Retrospective Cohort Study", Drugs—Real World Outcomes, vol. 3, 2016, pp. 369-381.

(Continued)

*Primary Examiner* — Hong Sang
(74) *Attorney, Agent, or Firm* — Adler Pollock & Sheehan P.C.

(57) ABSTRACT

Described herein are compositions and methods for the prevention or treatment of rheumatoid arthritis (RA). In some embodiments, RA is prevented or treated by (i) extracting peripheral blood mononuclear cells (PBMCs) and/or bone marrow mononuclear cells (BMMCs) from a subject at risk of, or afflicted with, RA; (ii) exposing the PBMCs/BMMCs to an effective amount of one or more SHIP-1 inhibitor and/or a pan-SHIP1/2 inhibitor to induce ex vivo expansion of the subject's myeloid derived suppressor cells (MDSCs); and (iii) administering intravenously to the subject a therapeutically effective number of MDSCs.

3 Claims, 8 Drawing Sheets

(56) References Cited

OTHER PUBLICATIONS

Klareskog, et al., "Rheumatoid Arthritis", Lancet, vol. 373, Feb. 21, 2009, pp. 659-672.
Klinger, et al., "Mesenchymal Stem Cell Extracellular Vesicles Reverse Sugen/Hypoxia Pulmonary Hypertension in Rats", Am J Respir Cell Mol Biol., vol. 62, 2020, pp. 577-587.
Liang, et al., "Deficiency of Lipid Phosphatase SHIP Enables Long-Term Reconstitution of Hematopoietic Inductive Bone Marrow Microenvironment", Dev Cell., vol. 25, 2013, pp. 333-349.
Liang, et al., "Endothelial to haematopoietic transition contributes to pulmonary arterial hypertension", Cardiovasc Res., vol. 113, 2017, pp. 1560-1573.
Liang, et al., "Mesenchymal stromal cells expressing heme oxygenase-1 reverse pulmonary hypertension", Stem Cells., vol. 29, 2011, pp. 99-107.
O'Shea, et al., "The JAK-STAT pathway: impact on human disease and therapeutic intervention", Annu Rev Med., vol. 66, 2015, pp. 311-328.
Papagoras, et al., "Abatacept: a biologic immune modulator for rheumatoid arthritis", Expert Opin Biol Ther., vol. 11, 2011, pp. 1113-1129.
Pelechas, et al., "Golimumab for Rheumatoid Arthritis", J. Clin. Med., vol. 8, No. 387, 2019, 7 pages.
Rubbert-Roth, et al., "Treatment options in patients with rheumatoid arthritis failing initial TNF inhibitor therapy: a critical review", Arthritis Research & Therapy, vol. 11, Suppl 1, 2009, 12 pages.
Schioppo, et al., "Current perspective on rituximab in rheumatic diseases", Drug Des Devel Ther., vol. 11, 2017, pp. 2891-2904.
Scott, Lesley J., "Tocilizumab: A Review in Rheumatoid Arthritis", Drugs, vol. 77,, 2017, pp. 1865-1879.
Singh, et al., "2015 American College of Rheumatology Guideline for the Treatment of Rheumatoid Arthritis", Arthritis & Rheumatology, vol. 68, No. 1, Jan. 2016, pp. 1-26.
Singh, et al., "A network meta-analysis of randomized controlled trials of biologics for rheumatoid arthritis: a Cochrane overview", CMAJ, vol. 181, 2009, pp. 787-796.
So, et al., "Inhibition of Lipid Phosphatase SHIP1 Expands Myeloid-Derived Suppressor Cells and Attenuates Rheumatoid Arthritis in Mice", 2018 ACR/ARHP Annual Meeting; Retrieved from the Internet URL: https://acrabstracts.org/abstract/inhibition-of-lipid-phosphatase-ship1-expands-myeloid-derived-suppressor-cells-and-attenuates-rheumatoid-arthritis, Oct. 21, 2018, 2 pages.
So, Ey, et al., "Inhibition of lipid phosphatase SHIP1 expands myeloid-derived suppressor cells and attenuates rheumatoid arthritis in mice.", American Journal of Physiology—Cell Physiology, vol. 321, No. 3,, Sep. 1, 2021,, pp. C569-C584.
So, et al., "Lipid phosphatase SHIP-1 regulates chondrocyte hypertrophy and skeletal development", J Cell Physiol., vol. 235, 2020, pp. 1425-1437.
So, et al., "Loss of lipid phosphatase SHIP1 promotes macrophage differentiation through suppression of dendritic cell differentiation", Cancer Biol Ther., vol. 20, 2019, pp. 201-211.
Brooks, et al., "SHIP1 Inhibition Increases Immunoregulatory Capacity and Triggers Apoptosis of Hematopoietic Cancer Cells", The Journal of Immunology, vol. 184, No. 7, 2010, pp. 3582-3589.
Gabrilovich, et al., "Myeloid-Derived Suppressor Cells as Regulators of the Immune System", Nature Reviews, Immunology, vol. 9, Mar. 2009, pp. 162-174.
Miao, et al., "Discovery and Evaluation of Novel SHIP-1 Inhibitors", Bioorganic & Medicinal Chemistry, vol. 114, 2024, 13 pages.
Pedicone, et al., "Pan-SHIP1/2 Inhibitors Promote Microglia Effector Functions Essential for Cns Homeostasis", Journal of Cell Science, vol. 133, 2020, 13 pages.
Suwa, et al., "Discovery and Functional Characterization of a Novel Small Molecule Inhibitor of the Intracellular Phosphatase, SHIP2", British Journal of Pharmacology, vol. 158, 2009, pp. 879-887.
Mernes, et al., "Discovery and Development of Small Molecule SHIP Phosphatase Modulators", Medicinal Research Reviews, vol. 34, No. 4, 2014, pp. 795-824.

\* cited by examiner

COMPOSITIONS AND METHODS FOR THE PREVENTION OR TREATMENT OF RHEUMATOID ARTHRITIS

CROSS REFERENCE TO RELATED APPLICATIONS

This application is a national phase filing under 35 U.S.C. § 371 of International Application No. PCT/US2022/023324 filed Apr. 4, 2022, which claims priority to U.S. Provisional Patent Application No. 63/170,667 filed Apr. 5, 2021, the entire contents of which are incorporated herein by reference.

STATEMENT REGARDING FEDERALLY SPONSORED RESEARCH OR DEVELOPMENT

This invention was made with government support under 1P20GM119943 awarded by National Institutes of Health. The government has certain rights in the invention.

FIELD OF THE INVENTION

The embodiments of the present invention relate to compositions and methods for the prevention or treatment of rheumatoid arthritis (RA). More specifically, RA is prevented or treated by administering to a subject at risk of, or afflicted with, RA a therapeutically effective number of myeloid derived suppressor cells (MDSCs).

BACKGROUND OF THE INVENTION

Rheumatoid arthritis (RA) is a chronic debilitating inflammatory autoimmune disease influenced by both genetic and environmental factors. RA is characterized by infiltration and accumulation of auto-reactive immune cells in the synovial joints. Joint inflammation is associated with joint pain, swelling and stiffness, joint surface erosion and bone resorption, leading to joint loss of function and disability.[1,2] RA attacks joints in the hands, wrists, and knees, causing chronic pain and deformity. In Caucasian populations, the occurrence has been estimated to be between 0.5 to 1%.[3,4] About 1.3 million Americans are afflicted with RA. In addition to patients' loss of quality of life, the estimated excess annual cost for RA in the US was $19.3 billion in 2005 dollars.[5] If the disease remains untreated, it can cause severe joint damage, bone destruction, poor quality of life, and high morbidity and mortality.[6] RA is also a systemic disease that affects lungs, heart, and eyes. Thus, early diagnosis and early intervention are imperative. To this end, the 1987 American College of Rheumatology (ACR) and the ACR/European League Against Rheumatism (EULAR) 2010 classification criteria helped physicians to improve their diagnostic accuracy.[7]

For patients with RA, several treatment options are available to improve signs and symptoms, control inflammation, reduce joint damage progression, and subsequently improve patients' health-related quality of life and their ability to perform daily activities. Methotrexate (MTX) is the first-line treatment recommended for patients with RA and is often administered alone or in combination with other conventional synthetic disease-modifying antirheumatic drugs (csDMARDs).[8] The introduction of biologic DMARDs (bDMARDs) targeting cytokines, such as tumor necrosis factor-α (TNF-α)[9,10] the interleukin (IL)-6 receptor,[11] co-stimulatory molecules of T-cells,[12] or other molecules of B-cells,[13] and targeted synthetic DMARDs (tsDMARDs) inhibiting the Janus kinases (JAK)[14,15] has revolutionized RA management.

However, for each currently licensed biologic therapeutic typically around 30-40% of patients fail to achieve even a 20% improvement in their disease[16] and the rate of secondary failure increases further.[17] In addition, the use of bDMARDs are associated with an increased risk of infection, malignancy, and adverse events. They require extensive frequent laboratory monitoring and the average yearly cost for bDMARDs is approximately $26,000/year/patient.[18] The fact that there is no cure for RA and no drugs are universally effective for all patients with RA, demonstrates a tremendous unmet need for RA therapy. Thus, novel immunological strategies to reset the autoimmune system may be a promising alternative to alleviate the disease and to avoid chronic use of the current DMARDs.

Accordingly, there remains a significantly unmet clinical need for the development of novel treatment strategies for RA and RA therapies.

BRIEF SUMMARY OF THE INVENTION

The embodiments of the present invention provide compositions and methods for the prevention or treatment of RA. The invention is based on the empirical observations described herein that myeloid derived suppressor cells (MDSCs) have a remarkable ability to suppress the immune responses of a T-cell subset that causes RA and that exogenous MDSCs can be harnessed as a cellular therapy for RA by using autologous MDSCs to dampen the autoimmune system and alleviate the disease.

In some embodiments, rheumatoid arthritis (RA) is prevented and/or treated in a subject at risk for, or afflicted with, RA by first extracting peripheral blood mononuclear cells (PBMCs) or bone marrow mononuclear cells (BMMCs) from the subject. These PBMCs/BMMCs are then exposed to an effective amount of one or more SHIP-1 inhibitor to induce ex vivo expansion of the subject's MDSCs. Once the subject's MDSCs have been expanded, a therapeutically effective number of these MDSCs are administered intravenously to the subject to prevent or treat the symptoms of RA.

In some embodiments, the one or more SHIP1 inhibitor is a selective SHIP-1 inhibitor and/or a pan-SHIP1/2 inhibitor, or functionally-equivalent analogs thereof. In some embodiments, the selective SHIP-1 inhibitor is 3α-aminocholestane (3AC). In some embodiments, the pan-SHIP1/2 inhibitor is selected from the group consisting of: Compound 26, Compound 27, Compound 28, K116, K118, K149, K161, and AS194490.

In another aspect, rheumatoid arthritis (RA) is prevented and/or treated in a subject at risk for, or afflicted with, RA by administering to the subject a therapeutically effective amount of one or more SHIP1 inhibitor, wherein the one or more SHIP1 inhibitor induces an increase in the subject's MDSCs in vivo.

In some embodiments, the one or more SHIP1 inhibitor is a selective SHIP-1 inhibitor and/or a pan-SHIP1/2 inhibitor, or functionally-equivalent analogs thereof. In some embodiments, the selective SHIP-1 inhibitor is 3AC. In some embodiments, the pan-SHIP1/2 inhibitor is selected from the group consisting of: Compound 26, Compound 27, Compound 28, K116, K118, K149, K161, and AS194490.

Other implementations are also described and recited herein.

BRIEF DESCRIPTION OF THE DRAWINGS

For the purpose of illustration, certain embodiments of the present invention are shown in the drawings described below. It should be understood, however, that the invention is not limited to the precise arrangements, dimensions, and instruments shown. In the drawings:

FIG. 1A-C: Significant expansion of MDSCs in SHIP1 KO mice compared to WT littermates in peripheral blood (PB) (FIG. 1A), spleen (SP) (FIG. 1B) and bone marrow (BM) (FIG. 1C). FIG. 1D-E: Expansion of Tregs in SHIP1 KO mice compared to WT littermates in PB (FIG. 1D) and SP (FIG. 1E). Data in (FIG. 1A-E) are mean±SEM. **=P<0.0001, *=P<0.001, *=P<0.05, Student's t-test.

FIG. 2A: Western blot analysis of splenocytes isolated from C57BL/6 WT and SHIP1 KO mice (left panel), vehicle- and 3AC-treated DBA/1 mice (right panel). Mice were sacrificed and splenocytes were isolated. Cell lysates were separated on an 8% SDS-PAGE gel and analyzed by Western blotting using specific antibodies against SHIP-1 and loading control β-Actin. FIG. 2B-D: MDSC expansion in peripheral blood (PB) (FIG. 2B), spleen (SP) (FIG. 2C), and bone marrow (BM) (FIG. 1D) of 3AC-treated mice compared to non-treated or vehicle-treated mice. Single cell suspensions were obtained and the percentage of CD11b+ Gr-1+ MDSCs were quantified by flow cytometry. FIG. 2E and FIG. 2F: Number of CD3+ T cells in peripheral blood (PB) (FIG. 2E), and spleen (SP) (FIG. 2F) of non-treated, vehicle-treated and 3AC-treated mice were analyzed by flow cytometry. FIG. 2G and FIG. 2H: Number of CD4+CD25+ Tregs in PB (FIG. 2G) and SP (FIG. 2H) of vehicle-treated and 3AC-treated mice were analyzed by flow cytometry. Data in (FIG. 2B-H) are mean±SEM. **=P<0.0001, =P<0.01, *=P<0.05, ordinary one-way ANOVA with multiple comparisons (FIG. 2B-F), Student's t-test (FIG. 2G-H).

FIG. 3A: Schematic of the experimental design of a prevention model. DBA/1 mice were injected with 3AC or vehicle daily for 7 days prior to CIA induction. CIA was induced by first immunization at day 0 with CFA mixed with 200 μg Cn II, and second immunization at day 21 with Cn II in ICFA. Cn II: Collagen type II; CFA: Freund's adjuvant; ICFA: Incomplete Freund's adjuvant. FIG. 3B and FIG. 3C: Delayed onset (FIG. 3B) and reduced severity (FIG. 3C) in 3AC-treated mice compared to vehicle-treated mice. As expected, inflammatory arthritis started to develop in vehicle-treated mice between 20-30 days after first immunization. In 3AC-treated mice, however, swelling and redness of limbs started to appear between 30-40 days. FIG. 3D: Administration of 3AC significantly and transiently increased MDSCs in PB. FIG. 3E: 3AC treatment decreased total CD3+ T cell number in PB. FIG. 3F: Steady expansion of Tregs in SP following 3AC treatment. Data in FIG. 3C-F are mean±SEM. **=P<0.0001, =P<0.01, *=P<0.05, Student's t-test.

FIG. 4A-F: Representative photographic assessment on CIA development by viewing a pair of front paws from normal mice with no CIA induction (FIG. 4A and FIG. 4B), vehicle-treated mice with CIA induction (FIG. 4C and FIG. 4D), and 3AC-treated mice with CIA induction (FIG. 4E and FIG. 4F). FIG. 4G-L: Representative radiographic assessment on CIA development by viewing the same pair of front paws as above from normal mice with no CIA induction (FIG. 4G and FIG. 4H), vehicle-treated mice with CIA induction (FIG. 4I and FIG. 4J), and 3AC-treated mice with CIA induction (FIG. 4K and FIG. 4L). N=5 mice in each group.

FIG. 5A-B: Hematoxylin and eosin (H&E) staining of wrist joints of front paws from vehicle-treated mice with CIA induction (FIG. 5A), and 3AC-treated mice with CIA induction (FIG. 5B). Inflammatory cell infiltration (black arrows) are visible in the wrist joint area from vehicle-treated mice but much less so in the 3AC-treated mice. FIG. 5C-D: Safranin O staining of cartilage, where cartilage stains orange color, of front paws from vehicle-treated mice with CIA induction (FIG. 5C) and 3AC-treated mice with CIA induction (FIG. 5D). Much less cartilage staining (black arrows) was seen in the vehicle-treated CIA mice than in the 3AC-treated CIA mice. FIG. 5E-F: Toluidine Blue staining of mineralized bones, which appears dark blue, of front paws from vehicle-treated mice with CIA induction (FIG. 5E), and 3AC-treated mice with CIA induction (FIG. 5F). Apparent bone erosion (black arrows) can be seen in vehicle-treated mice, but not in the 3AC-treated mice. N=5 mice in each group.

FIG. 6A: Schematic of the experimental design of an intervention model. CIA was induced in DBA/1 mice by first immunization at day 0 with CFA mixed with 200 μg Cn II, and second immunization at day 21 with Cn II in ICFA. These mice were then injected with 3AC or vehicle daily for 7 days starting on day 27. FIG. 6B-C: Delayed onset (FIG. 6B) and reduced severity (FIG. 6C) in 3AC-treated mice compared to vehicle-treated mice. FIG. 6D: Administration of 3AC significantly and transiently increased MDSCs in PB on day 34. FIG. 6E: 3AC treatment decreased total CD3+ T cell number in PB on day 34. FIG. 6F-G: Comparable number of Tregs in PB (FIG. 6F) and SP (FIG. 6G) of both vehicle- and 3AC-treated group. Data in (FIG. 6C-G) are mean±SEM. **=P<0.0001, *=P<0.001, **=P<0.01, Student's t-test.

FIG. 7A: Isolation of CD11b+Gr-1+ MDSCs from spleens of 3AC-treated DBA/1 mice using flow cytometry. FIG. 7B: Schematic of the experimental design of an adoptive transfer model. CIA was induced in DBA/1 mice by first immunization at day 0 with CFA mixed with 200 μg Cn II, and second immunization at day 21 with Cn II in ICFA. Flow cytometry sorted MDSCs from spleens of 3AC-treated mice were i.v. injected one day before each immunization at $8 \times 10^5$ cells each recipient per injection. FIG. 7C-D, Delayed onset (FIG. 7C) and reduced severity (FIG. 7D) in MDSC-injected mice compared to vehicle-treated mice. Data in (FIG. 7D) are mean±SEM. **=P<0.01, *=P<0.05, Student's t-test.

FIG. 8A: Schematic of the experimental design of CIA model with C57BL/6 mice. C57BL/6 WT and SHIP1 KO mice of 8-10 weeks old were injected at the base of the tail with total 100 μL CFA emulsion containing 200 μg chicken Cn II and 250 μg *M. tuberculosis* (MTB) at day 0 as a first immunization. Cn II in ICFA were injected i.d. on day 21 as a second immunization. Cn II: Collagen type II; CFA: Freund's adjuvant; ICFA: Incomplete Freund's adjuvant. FIG. 8B-C: Delayed onset (FIG. 8B) and reduced severity (FIG. 8C) in C57BL/6 WT mice compared to SHIP1 KO mice. The WT mice with 3AC pre-treatment did not develop CIA. Data in (FIG. 8C) are mean±SEM. **=P<0.0001, *=P<0.001, **=P<0.01, *=P<0.05, Student's t-test. FIG. 8D-E: The number of MDSCs in the PB were initially much higher in SHIP1 KO mice than in WT mice. However, the number of MDSCs in SHIP1 KO mice decreased rapidly during CIA development while MDSCs in WT mice increased steadily. Data in (FIG. 8D-E) are mean±SEM. **=P<0.0001, *=P<0.001, *=P<0.05, Student's t-test. FIG. 8F: The number of MDSCs in the SP were initially much higher in SHIP1 KO mice than in WT mice. However, the number of MDSCs in SHIP1 KO mice decreased rapidly during CIA development while MDSCs in WT mice increased steadily. On day 0, **=P<0.0001, when SHIP1 KO compared to WT; =P<0.01, when WT+3AC compared to WT. On day 80, *=P<0.05, when WT compared to SHIP1 KO; **=P<0.01, when WT+3AC compared to SHIP1 KO.

DETAILED DESCRIPTION OF THE INVENTION

Figure 1:
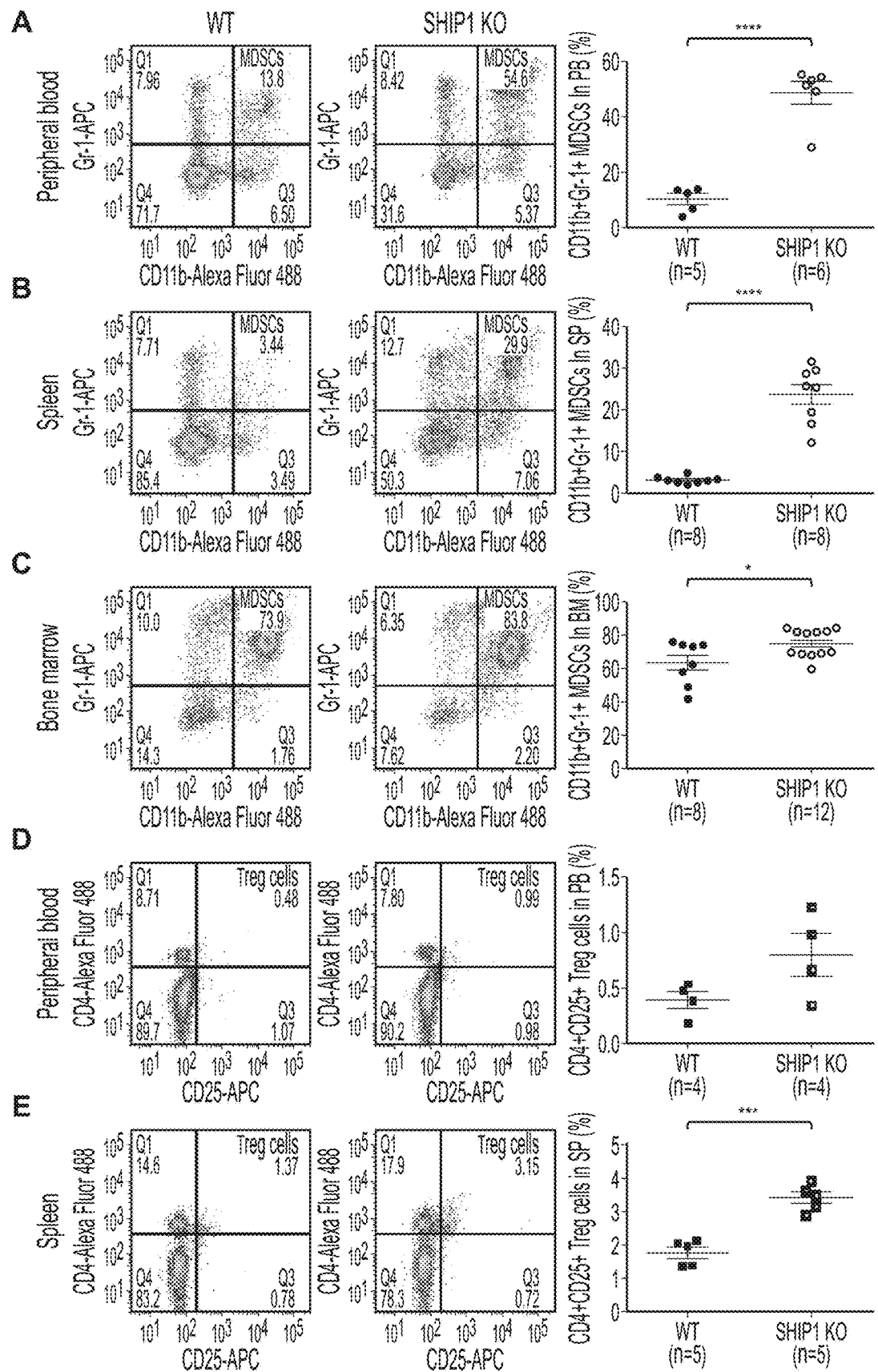
FIG. 1 shows the expansion of MDSCs and regulatory T cells (Tregs) in peripheral tissues and BM of SHIP1 KO mice.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention. It is to be appreciated that certain aspects, modes, embodiments, variations and features of the invention are described below in various levels of detail in order to provide a substantial understanding of the present invention.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs. If there is an apparent discrepancy between the usage of a term in the art and its definition provided herein, the definition provided within the specification shall prevail.

As used in this specification and the appended claims, the singular forms "a," "an" and "the" include plural referents unless the content clearly dictates otherwise. For example, reference to "a cell" includes a combination of two or more cells, and the like.

As used herein, the term "approximately" or "about" in reference to a value or parameter are generally taken to include numbers that fall within a range of 5%, 10%, 15%, or 20% in either direction (greater than or less than) of the number unless otherwise stated or otherwise evident from the context (except where such number would be less than 0% or exceed 100% of a possible value). As used herein, reference to "approximately" or "about" a value or parameter includes (and describes) embodiments that are directed to that value or parameter. For example, description referring to "about X" includes description of "X".

As used herein, the term "or" means "and/or." The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "comprising" means that other elements can also be present in addition to the defined elements presented. The use of "comprising" indicates inclusion rather than limitation.

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of additional elements that do not materially affect the basic and novel or functional characteristic(s) of that embodiment of the invention.

The term "statistically significant" or "significantly" refers to statistical significance and generally means a two-standard deviation (2SD) or greater difference.

As used herein, the term "subject" refers to a mammal, including but not limited to a dog, cat, horse, cow, pig, sheep, goat, chicken, rodent, or primate. Subjects can be house pets (e.g., dogs, cats), agricultural stock animals (e.g., cows, horses, pigs, chickens, etc.), laboratory animals (e.g., mice, rats, rabbits, etc.), but are not so limited. Subjects include human subjects. The human subject may be a pediatric, adult, or a geriatric subject. The human subject may be of either sex.

As used herein, the terms "effective amount" and "therapeutically-effective amount" include an amount sufficient to prevent or ameliorate a manifestation of disease or medical condition, such as rheumatoid arthritis. It will be appreciated that there will be many ways known in the art to determine the effective amount for a given application. For example, the pharmacological methods for dosage determination may be used in the therapeutic context. In the context of therapeutic or prophylactic applications, the amount of a composition administered to the subject will depend on the type and severity of the disease and on the characteristics of the individual, such as general health, age, sex, body weight and tolerance to drugs. It will also depend on the degree, severity and type of disease. The skilled artisan will be able to determine appropriate dosages depending on these and other factors. The compositions can also be administered in combination with one or more additional therapeutic compounds.

As used herein, the terms "treat," "treatment," "treating," or "amelioration" when used in reference to a disease, disorder or medical condition, refer to therapeutic treatments for a condition, wherein the object is to reverse, alleviate, ameliorate, inhibit, slow down or stop the progression or severity of a symptom or condition. The term "treating" includes reducing or alleviating at least one adverse effect or symptom of a condition. Treatment is generally "effective" if one or more symptoms or clinical markers are reduced. Alternatively, treatment is "effective" if the progression of a condition is reduced or halted. That is, "treatment" includes not just the improvement of symptoms or markers, but also a cessation or at least slowing of progress or worsening of symptoms that would be expected in the absence of treatment. Beneficial or desired clinical results include, but are not limited to, alleviation of one or more symptom(s), diminishment of extent of the deficit, stabilized (i.e., not worsening) state of symptoms including, but not limited to, pain in the joints, back, or muscles; joint stiffness, swelling, tenderness, or weakness; whole body fatigue, anemia, or malaise; skin lumps or redness; bump on the finger or swelling of the hand; flare; dry mouth; physical deformity; and/or sensation of pins and needles as compared to that expected in the absence of treatment.

As used herein, the term "long-term" administration means that the therapeutic agent or drug is administered for a period of at least 12 weeks. This includes that the therapeutic agent or drug is administered such that it is effective over, or for, a period of at least 12 weeks and does not necessarily imply that the administration itself takes place for 12 weeks, e.g., if sustained release compositions or long-acting therapeutic agent or drug is used. Thus, the subject is treated for a period of at least 12 weeks. In many cases, long-term administration is for at least 4, 5, 6, 7, 8, 9 months or more, or for at least 1, 2, 3, 5, 7 or 10 years, or more.

The administration of the compositions contemplated herein may be carried out in any convenient manner, including by aerosol inhalation, injection, ingestion, transfusion, implantation or transplantation. In a preferred embodiment, compositions are administered parenterally. The phrases "parenteral administration" and "administered parenterally" as used herein refers to modes of administration other than enteral and topical administration, usually by injection, and includes, without limitation, intravascular, intravenous, intramuscular, intraarterial, intrathecal, intracapsular, intraorbital, intratumoral, intracardiac, intradermal, intraperitoneal, transtracheal, subcutaneous, subcuticular, intraarticular, subcapsular, subarachnoid, intraspinal and intrasternal injection and infusion. In one embodiment, the compositions contemplated herein are administered to a subject by direct injection into a tumor, lymph node, or site of infection.

The terms "decrease," "reduced," "reduction," or "inhibit" are all used herein to mean a decrease by a statistically significant amount. In some embodiments, "reduce," "reduction" or "decrease" or "inhibit" typically means a decrease by at least 10% as compared to a reference level (e.g., the absence of a given treatment or agent) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. A decrease can be preferably down to a level accepted as within the range of normal for an individual without a given disorder.

The terms "increased," "increase," "enhance," or "activate" are all used herein to mean an increase by a statically significant amount. In some embodiments, the terms "increased," "increase," "enhance," or "activate" can mean an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, a "increase" is a statistically significant increase in such level.

Pharmaceutical Compositions

The compositions and methods of the present invention may be utilized to treat an individual in need thereof. In certain embodiments, the individual is a mammal such as a human, or a non-human mammal. When administered to an animal, such as a human, the composition or the compound is preferably administered as a pharmaceutical composition comprising, for example, a compound of the invention and a pharmaceutically acceptable carrier. Pharmaceutically acceptable carriers are well known in the art and include, for example, aqueous solutions such as water or physiologically buffered saline or other solvents or vehicles such as glycols, glycerol, oils such as olive oil, or injectable organic esters. In preferred embodiments, when such pharmaceutical compositions are for human administration, particularly for invasive routes of administration (i.e., routes, such as injection or implantation, that circumvent transport or diffusion through an epithelial barrier), the aqueous solution is pyrogen-free, or substantially pyrogen-free. The excipients can be chosen, for example, to effect delayed release of an agent or to selectively target one or more cells, tissues or organs. The pharmaceutical composition can be in dosage unit form such as tablet, capsule (including sprinkle capsule and gelatin capsule), granule, lyophile for reconstitution, powder, solution, syrup, suppository, injection or the like. The composition can also be present in a transdermal delivery system, e.g., a skin patch. The composition can also be present in a solution suitable for topical administration, such as a lotion, cream, or ointment.

A pharmaceutically acceptable carrier can contain physiologically acceptable agents that act, for example, to stabilize, increase solubility or to increase the absorption of a compound such as a compound of the invention. Such physiologically acceptable agents include, for example, carbohydrates, such as glucose, sucrose or dextrans, antioxidants, such as ascorbic acid or glutathione, chelating agents, low molecular weight proteins or other stabilizers or excipients. The choice of a pharmaceutically acceptable carrier, including a physiologically acceptable agent, depends, for example, on the route of administration of the composition. The preparation or pharmaceutical composition can be a self-emulsifying drug delivery system or a self-micro emulsifying drug delivery system. The pharmaceutical composition (preparation) also can be a liposome or other polymer matrix, which can have incorporated therein, for example, a compound of the invention. Liposomes, for example, which comprise phospholipids or other lipids, are nontoxic, physiologically acceptable and metabolizable carriers that are relatively simple to make and administer.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier" as used herein means a pharmaceutically acceptable material, composition or vehicle, such as a liquid or solid filler, diluent, excipient, solvent or encapsulating material. Each carrier must be "acceptable" in the sense of being compatible with the other ingredients of the formulation and not injurious to the patient. Some examples of materials which can serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

A pharmaceutical composition (preparation) can be administered to a subject by any of a number of routes of administration including, for example, orally (for example, drenches as in aqueous or non-aqueous solutions or suspensions, tablets, capsules (including sprinkle capsules and gelatin capsules), boluses, powders, granules, pastes for application to the tongue); absorption through the oral mucosa (e.g., sublingually); subcutaneously; transdermally (for example as a patch applied to the skin); and topically (for example, as a cream, ointment or spray applied to the skin). The compound may also be formulated for inhalation. In certain embodiments, a compound may be simply dissolved or suspended in sterile water. Details of appropriate routes of administration and compositions suitable for same can be found in, for example, U.S. Pat. Nos. 6,110,973, 5,763,493, 5,731,000, 5,541,231, 5,427,798, 5,358,970 and 4,172,896, as well as in patents cited therein.

The formulations may conveniently be presented in unit dosage form and may be prepared by any methods well known in the art of pharmacy. The amount of active ingredient which can be combined with a carrier material to produce a single dosage form will vary depending upon the host being treated, the particular mode of administration. The amount of active ingredient that can be combined with a carrier material to produce a single dosage form will generally be that amount of the compound which produces a therapeutic effect. Generally, out of one hundred percent, this amount will range from about 1 percent to about ninety-nine percent of active ingredient, preferably from about 5 percent to about 70 percent, most preferably from about 10 percent to about 30 percent.

Methods of preparing these formulations or compositions include the step of bringing into association an active compound, such as a compound of the invention, with the carrier and, optionally, one or more accessory ingredients. In general, the formulations are prepared by uniformly and intimately bringing into association a compound of the present invention with liquid carriers, or finely divided solid carriers, or both, and then, if necessary, shaping the product.

Formulations of the invention suitable for oral administration may be in the form of capsules (including sprinkle capsules and gelatin capsules), cachets, pills, tablets, lozenges (using a flavored basis, usually sucrose and acacia or tragacanth), lyophile, powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like, each containing a predetermined amount of a compound of the present invention as an active ingredient. Compositions or compounds may also be administered as a bolus, electuary or paste.

To prepare solid dosage forms for oral administration (capsules (including sprinkle capsules and gelatin capsules), tablets, pills, dragées, powders, granules and the like), the active ingredient is mixed with one or more pharmaceutically acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; (10) complexing agents, such as, modified and unmodified cyclodextrins; and (11) coloring agents. In the case of capsules (including sprinkle capsules and gelatin capsules), tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (for example, gelatin or hydroxypropyl methyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the powdered compound moistened with an inert liquid diluent.

The tablets, and other solid dosage forms of the pharmaceutical compositions, such as dragées, capsules (including sprinkle capsules and gelatin capsules), pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropyl methyl cellulose in varying proportions to provide the desired release profile, other polymer matrices, liposomes and/or microspheres. They may be sterilized by, for example, filtration through a bacteria-retaining filter, or by incorporating sterilizing agents in the form of sterile solid compositions that can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions that can be used include polymeric substances and waxes. The active ingredient can also be in micro-encapsulated form, if appropriate, with one or more of the above-described excipients.

Liquid dosage forms useful for oral administration include pharmaceutically acceptable emulsions, lyophiles for reconstitution, micro-emulsions, solutions, suspensions, syrups and elixirs. In addition to the active ingredient, the liquid dosage forms may contain inert diluents commonly used in the art, such as, for example, water or other solvents, cyclodextrins and derivatives thereof, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming and preservative agents.

Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Dosage forms for the topical or transdermal administration include powders, sprays, ointments, pastes, creams, lotions, gels, solutions, patches and inhalants. The active compound may be mixed under sterile conditions with a pharmaceutically acceptable carrier, and with any preservatives, buffers, or propellants that may be required.

The ointments, pastes, creams, and gels may contain, in addition to an active compound, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to an active compound, excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane.

Transdermal patches have the added advantage of providing controlled delivery of a compound of the present invention to the body. Such dosage forms can be made by dissolving or dispersing the active compound in the proper medium. Absorption enhancers can also be used to increase the flux of the compound across the skin. The rate of such flux can be controlled by either providing a rate controlling membrane or dispersing the compound in a polymer matrix or gel.

The phrases "parenteral administration" and "administered parenterally" as used herein means modes of administration other than enteral and topical administration, usually by injection, and includes, without limitation, intravenous, intraocular (such as intravitreal), intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal and intrasternal injection and infusion. Pharmaceutical compositions suitable for parenteral administration comprise one or more active compounds in combination with one or more pharmaceutically acceptable sterile isotonic aqueous or nonaqueous solutions, dispersions, suspensions or emulsions, or sterile powders which may be reconstituted into sterile injectable solutions or dispersions just prior to use, which may contain antioxidants, buffers, bacteriostats, solutes which render the formulation isotonic with the blood of the intended recipient or suspending or thickening agents.

Examples of suitable aqueous and nonaqueous carriers that may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate. Examples of suitable aqueous and nonaqueous carriers that may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants. Proper fluidity can be maintained, for example, by the use of coating materials, such as lecithin, by the maintenance of the required particle size in the case of dispersions, and by the use of surfactants.

These compositions may also contain adjuvants such as preservatives, wetting agents, emulsifying agents and dispersing agents. Prevention of the action of microorganisms may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents that delay absorption such as aluminum monostearate and gelatin.

In some cases, in order to prolong the effect of a drug, it is desirable to slow the absorption of the drug from subcutaneous or intramuscular injection. This may be accomplished by the use of a liquid suspension of crystalline or amorphous material having poor water solubility. The rate of absorption of the drug then depends upon its rate of dissolution, which, in turn, may depend upon crystal size and crystalline form. Alternatively, delayed absorption of a parenterally administered drug form is accomplished by dissolving or suspending the drug in an oil vehicle.

Injectable depot forms are made by forming microencapsulated matrices of the subject compounds in biodegradable polymers such as polylactide-polyglycolide. Depending on the ratio of drug to polymer, and the nature of the particular polymer employed, the rate of drug release can be controlled. Examples of other biodegradable polymers include poly(orthoesters) and poly(anhydrides). Depot injectable formulations are also prepared by entrapping the drug in liposomes or microemulsions that are compatible with body tissue.

For use in the methods of this invention, active compounds can be given per se or as a pharmaceutical composition containing, for example, 0.1 to 99.5% (more preferably, 0.5 to 90%) of active ingredient in combination with a pharmaceutically acceptable carrier.

Methods of introduction may also be provided by rechargeable or biodegradable devices. Various slow-release polymeric devices have been developed and tested in vivo in recent years for the controlled delivery of drugs, including proteinaceous biopharmaceuticals. A variety of biocompatible polymers (including hydrogels), including both biodegradable and non-degradable polymers, can be used to form an implant for the sustained release of a compound at a particular target site.

Actual dosage levels of the active ingredients in the pharmaceutical compositions may be varied so as to obtain an amount of the active ingredient that is effective to achieve the desired therapeutic response for a particular patient, composition, and mode of administration, without being toxic to the patient.

The selected dosage level will depend upon a variety of factors including the activity of the particular compound or combination of compounds employed, or the ester, salt or amide thereof, the route of administration, the time of administration, the rate of excretion of the particular compound(s) being employed, the duration of the treatment, other drugs, compounds and/or materials used in combination with the particular compound(s) employed, the age, sex, weight, condition, general health and prior medical history of the patient being treated, and like factors well known in the medical arts.

A physician or veterinarian having ordinary skill in the art can readily determine and prescribe the therapeutically effective amount of the pharmaceutical composition required. For example, the physician or veterinarian could start doses of the pharmaceutical composition or compound at levels lower than that required in order to achieve the desired therapeutic effect and gradually increase the dosage until the desired effect is achieved. By "therapeutically effective amount" is meant the concentration of a compound that is sufficient to elicit the desired therapeutic effect. It is generally understood that the effective amount of the compound will vary according to the weight, sex, age, and medical history of the subject. Other factors which influence the effective amount may include, but are not limited to, the severity of the patient's condition, the disorder being treated, the stability of the compound, and, if desired, another type of therapeutic agent being administered with the compound of the invention. A larger total dose can be delivered by multiple administrations of the agent. Methods to determine efficacy and dosage are known to those skilled in the art. See, e.g., Isselbacher et al. (1996).[19]

In general, a suitable daily dose of an active compound used in the compositions and methods of the invention will be that amount of the compound that is the lowest dose effective to produce a therapeutic effect. Such an effective dose will generally depend upon the factors described above.

If desired, the effective daily dose of the active compound may be administered as one, two, three, four, five, six or more sub-doses administered separately at appropriate intervals throughout the day, optionally, in unit dosage forms. In certain embodiments of the present invention, the active compound may be administered two or three times daily. In other embodiments, the active compound will be administered once daily.

The patient receiving this treatment is any animal in need, including primates, in particular humans; and other mammals such as equines bovine, porcine, sheep, feline, and canine; poultry; and pets in general.

In certain embodiments, compounds of the invention may be used alone or conjointly administered with another type of therapeutic agent.

The present disclosure includes the use of pharmaceutically acceptable salts of compounds of the invention in the compositions and methods of the present invention. In certain embodiments, contemplated salts of the invention include, but are not limited to, alkyl, dialkyl, trialkyl or tetra-alkyl ammonium salts. In certain embodiments, contemplated salts of the invention include, but are not limited to, L-arginine, benenthamine, benzathine, betaine, calcium hydroxide, choline, deanol, diethanolamine, diethylamine, 2-(diethylamino)ethanol, ethanolamine, ethylenediamine, N-methylglucamine, hydrabamine, 1H-imidazole, lithium, L-lysine, magnesium, 4-(2-hydroxyethyl)morpholine, piperazine, potassium, 1-(2-hydroxyethyl)pyrrolidine, sodium, triethanolamine, tromethamine, and zinc salts. In certain embodiments, contemplated salts of the invention include, but are not limited to, Na, Ca, K, Mg, Zn or other metal salts.

In certain embodiments, contemplated salts of the invention include, but are not limited to, 1-hydroxy-2-naphthoic acid, 2,2-dichloroacetic acid, 2-hydroxyethanesulfonic acid, 2-oxoglutaric acid, 4-acetamidobenzoic acid, 4-aminosalicylic acid, acetic acid, adipic acid, l-ascorbic acid, l-aspartic acid, benzenesulfonic acid, benzoic acid, (+)-camphoric acid, (+)-camphor-10-sulfonic acid, capric acid (decanoic acid), caproic acid (hexanoic acid), caprylic acid (octanoic acid), carbonic acid, cinnamic acid, citric acid, cyclamic acid, dodecylsulfuric acid, ethane-1,2-disulfonic acid, ethanesulfonic acid, formic acid, fumaric acid, galactaric acid, gentisic acid, d-glucoheptonic acid, d-gluconic acid, d-glucuronic acid, glutamic acid, glutaric acid, glycerophosphoric acid, glycolic acid, hippuric acid, hydrobromic acid, hydrochloric acid, isobutyric acid, lactic acid, lactobionic acid, lauric acid, maleic acid, l-malic acid, malonic acid, mandelic acid, methanesulfonic acid, naphthalene-1,5-disulfonic acid, naphthalene-2-sulfonic acid, nicotinic acid, nitric acid, oleic acid, oxalic acid, palmitic acid, pamoic acid, phosphoric acid, proprionic acid, l-pyroglutamic acid, salicylic acid, sebacic acid, stearic acid, succinic acid, sulfuric acid, l-tartaric acid, thiocyanic acid, p-toluenesulfonic acid, trifluoroacetic acid, and undecylenic acid salts.

The pharmaceutically acceptable acid addition salts can also exist as various solvates, such as with water, methanol, ethanol, dimethylformamide, and the like. Mixtures of such solvates can also be prepared. The source of such solvate can be from the solvent of crystallization, inherent in the solvent of preparation or crystallization, or adventitious to such solvent.

Wetting agents, emulsifiers, and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically acceptable antioxidants include: (1) water-soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal-chelating agents, such as citric acid, ethylenediamine tetraacetic acid (EDTA), sorbitol, tartaric acid, phosphoric acid, and the like.

Unless otherwise defined herein, scientific and technical terms used in connection with the present application shall have the meanings that are commonly understood by those of ordinary skill in the art to which this disclosure belongs. It should be understood that this invention is not limited to the particular methodology, protocols, and reagents, etc., described herein and as such can vary. The terminology used herein is for the purpose of describing particular embodiments only and is not intended to limit the scope of the present invention, which is defined solely by the claims. Definitions of common terms in immunology and molecular biology can be found in The Merck Manual of Diagnosis and Therapy;[20] The Encyclopedia of Molecular Cell Biology and Molecular Medicine;[21] Molecular Biology and Biotechnology: a Comprehensive Desk Reference;[22] Immunology;[23] Janeway's Immunobiology;[24] Lewin's Genes XI;[25] Molecular Cloning: A Laboratory Manual.;[26] Basic Methods in Molecular Biology;[27] Laboratory Methods in Enzymology;[28] Current Protocols in Molecular Biology (CPMB);[29] Current Protocols in Protein Science (CPPS);[30] and Current Protocols in Immunology (CPI).[31]

In some embodiments of any of the aspects, the disclosure described herein does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and animals resulting from such processes.

Other terms are defined herein within the description of the various aspects of the invention.

Rheumatoid Arthritis

Rheumatoid arthritis (RA) is a chronic inflammatory autoimmune disease influenced by both genetic and environmental factors. RA is characterized by infiltration and accumulation of auto-reactive immune cells in the synovial joints. Joint inflammation is associated with joint pain, swelling and stiffness, joint surface erosion and bone resorption, leading to joint loss of function and disability. The etiology of these changes is associated with abnormal interactions between resident cells such as fibroblast-like synoviocytes and cells of the innate (e.g., macrophages, neutrophils, dendritic cells and NK cells) and adaptive immune system (e.g., B and T cells). These cells secrete several cytokines and inflammatory mediators including TNF-α, IL-1, IL-6, and others.

It is generally accepted that CD4+ T cells play a critical role in the initiation and perpetuation of this chronic inflammation. The inflammatory microenvironment within the joint supports differentiation of pro-inflammatory T (Th17) cells and inhibits the development of regulatory T cells (Tregs). An imbalance between Th17 cells and Tregs has been associated with RA severity and subsequent joint destruction.[32] In addition to cartilage and bone damage, the systemic effects of RA include an enhanced risk of cardiovascular disease.[33] For many patients, the advent of novel biological therapies such as those targeting TNF-α has revolutionized the treatment of RA. However, for each currently licensed biologic therapeutic, typically around 30-40% of patients fail to achieve even a 20% improvement in their disease[34] and the rate of secondary failure increases further.[35] Therefore, there remains a significantly unmet clinical need for the development of novel treatment strategies.

Myeloid-Derived Suppressor Cells

Myeloid-derived suppressor cells (MDSCs) are a heterogeneous population of immune regulatory cells that consists of myeloid progenitor cells, immature dendritic cells, immature granulocytes and immature macrophages. MDSCs have a remarkable ability to suppress immune responses of CD4+ T cells, CD8+ T cells and NK cells through enhancing production of arginase 1, inducible nitric oxide synthase, and reactive oxygen species.[36,37] Thus, MDSCs play an important role in tumor development, transplant tolerance and autoimmune disease.[38,39,40]

Recent clinical studies found that MDSCs are present at increased frequencies in the peripheral blood of patients with autoimmune diseases such as multiple sclerosis[41] and RA.[42] In addition, the synovial fluid from RA patients contained neutrophil-like MDSCs, which have a profound inhibitory effect on the joint-infiltrating T cells.[43] In mice, MDSCs are identified as cells that express both CD11b and Gr-1 (CD11b+Gr-1+). Gr-1 molecule includes the macrophage and neutrophils markers Ly6C and Ly6G, respectively. CD11b+Ly6G−Ly6C$^{high}$ cells have monocytic-like morphology and have been termed monocytic-MDSCs (M-MDSCs). CD11b+Ly6G+Ly6C$^{low}$ cells have granulocyte-like morphology and have been termed granulocytic MDSCs (G-MDSCs).[44] Fujii et al. (2013)[45] reported that mice with collagen-induced inflammatory arthritis (CIA) displayed expansion of MDSCs, and intravenous transfer of spleen-derived MDSCs was followed by a decrease in the number of CD4+ T cells and reduced arthritis severity in the recipient mice. This myeloid skewing in arthritis was thought to have occurred in hematopoietic stem and progenitor cells.[46] Accordingly, MDSCs may represent a potential therapeutic target leading to a different treatment strategy for RA.

Src Homology 2 (SH2) Domain Containing Inositol Polyphosphate 5-phosphatase 1

The Src homology 2 (SH2) domain containing inositol polyphosphate 5-phosphatase 1 (SHIP-1), also known as INPP5D, SHIP, SHIP1, SIP-145, hp51CN, p150Ship, and inositol polyphosphate-5-phosphatase D, is an enzyme with phosphatase activity. SHIP1 is structured by multiple domain and is encoded by the INPP5D gene in humans.[47,48] SHIP1 is expressed predominantly by hematopoietic cells[49] but also, for example, by osteoblasts[50] and endothelial cells.[51]

SHIP-1 controls phosphatidylinositol 3-kinase (PI3K) initiated signaling pathway by limiting cell membrane recruitment and activation of Akt. Specific ligand-receptor interactions recruit PI3K into proximity with its substrate phosphatidylinositol (4,5)-bisphosphate, PI(4,5)P2, to generate the second messenger phosphatidylinositol (3,4,5)-trisphosphate, PI(3,4,5)P3. SHIP-1 hydrolyzes PI(3,4,5)P3 to PI(3,4)P2. Both PI(3,4,5)P3 and PI(3,4)P2 have significant affinity for pleckstrin homology domain-containing kinases (e.g., Akt) that serve as effectors of PI3K signaling.[52,53] Unlike the 3-phosphatase and tumor suppressor PTEN, which primarily controls the levels of PI(3,4,5)P3,[54] the 5-phosphatase SHIP-1 modulates PI3K initiated signaling by limiting membrane recruitment and activation of Akt through both its substrate PI(3,4,5)P3 and its product PI(3,4)P2.[55,56,57]

Previous studies show that germline SHIP-1 deficiency, as well as myeloid-specific ablation of SHIP-1, lead to expansion of both MDSCs and Tregs.[58,59,60] SHIP-1 is also essential for normal Th17 cell development and playing a key role in the reciprocal regulation of Tregs and Th17 cells.[61] Furthermore, it was also shown that administration of a small molecule chemical inhibitor of SHIP-1, 3α-aminocholestane (3AC), could significantly expand the myeloid immunoregulatory cell compartment in wild-type (WT) C57BL/6 mice.[62] In addition, SHIP-1 was found to be required for dendritic cells development.[63,64]

Accordingly, the studies in the present disclosure investigated whether the inhibition of SHIP-1 would expand MDSCs in vivo and could be used as a therapeutic strategy to attenuate the development of RA.

SHIP-1 Inhibitors

The methods of the present invention involve the use of inhibitors of SHIP-1. SHIP-1 inhibitors that can be used in the methods of the present invention include, but are not limited to, at least one selective SHIP-1 inhibitor and/or at least one pan-SHIP1/2 inhibitor.

Selective SHIP 1 Inhibitor

3α-Aminocholestane (3AC; aka K110) is a selective SHIP-1 inhibitor with an $IC_{50}$ of ~2.5 µM (MW 387.68; Formula $C_{27}H_{49}N$; CAS No. 2206-20-4).[65] 3AC has been reported to have potential clinical application in the treatment of multiple tumor types.[66,67]

Pan-SHIP1/2 Inhibitors

Pan-SHIP1/2 inhibitors have affinity for and can inhibit both SHIP-1 and SHIP-2. High-throughput screening efforts in the Kerr group led to the discovery of several pan-SHIP1/2 inhibitors.[68] These inhibitors included the two quinoline aminoalcohols, 26 and 27, and tryptamine 28:

Quinolines 26 and 27 completely inhibited SHIP1 activity at 100 μM, while tryptamine 28 showed approximately 70% inhibition at this concentration. Against SHIP2, quinoline 26 showed approximately 60% inhibition at 100 μM, while quinoline 27 showed 90% inhibition and tryptamine 28 showed 50% inhibition at the same concentration. These compounds did not show inhibition of OCRL, another human inositol 5-phosphatase, suggesting that the molecules are not general phosphatase inhibitors but have some specificity toward the two SHIP paralogs.[69]

Other pan-SHIP1/2 inhibitors include, but are not limited to, K116, K118, K149, K161, and AS194490. Relevant information on these pan-SHIP1/2 inhibitors is provided in Table 1.[70]

K118 is a water-soluble derivative of 3AC and has comparable SHIP-1 inhibitor activity.[71] Treatment with K118 (10 mg/kg) on obese mice on a high fat diet resulted in reduced body mass and lowered fat content when compared to pre-treatment and non-treated control animals. The treated mice had reduced blood glucose and insulin levels in addition to improved glucose tolerance. K118 treatment also reduced the amount of age-related fat accumulation in mice.[72,73]

TABLE 1

| Compound | Structure | IC$_{50}$ SHIP1 (μM) | IC$_{50}$ SHIP2 (μM) |
|---|---|---|---|
| K116 [74] | 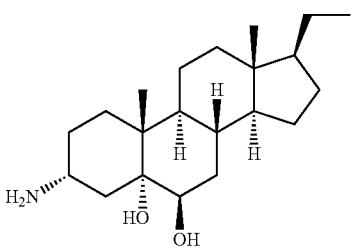 | 1.5-6 | 6.5-13 |

TABLE 1-continued

| Compound | Structure | IC$_{50}$ SHIP1 (μM) | IC$_{50}$ SHIP2 (μM) |
|---|---|---|---|
| K118 [75, 76] | | 16 | 25 |
| K149 [77] | | 20-30 | 30 |
| K161 [78] | | 6 | 5-10 |
| K185 [79] | | 18 | 30 |
| AS194490 [80] | | 13 | 0.6 |

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The technology described herein is further illustrated by the following examples which in no way should be construed as being further limiting. Although methods and materials similar or equivalent to those described herein can be used in the practice or testing of this disclosure, suitable methods and materials are described below.

EXAMPLES

The invention now being generally described, it will be more readily understood by reference to the following examples which are included merely for purposes of illustration of certain aspects and embodiments of the present invention and are not intended to limit the invention.

Example 1 Inhibition of Lipid Phosphatase SHIP-1 Expands Myeloid-Derived Suppressor Cells The purpose of the present study was to investigate the effect of inhibition of SHIP-1 on expansion of MDSCs.

Materials and Methods

Mice. All animals were maintained in pathogen-free conditions and all animal procedures followed protocols approved by the Institutional Animal Care and Use Committee (IACUC) of Rhode Island Hospital. The SHIP-1 knockout (KO) mice (Inpp5d<tm1Dmt>/J, Stock #003534) on a mixed genetic background (129/C57BL/6) were purchased from the Jackson Laboratory, Bar Harbor, ME, and backcrossed with C57BL/6 mice (Stock #000664, the Jackson Laboratory) for 5 generations. Heterozygous (SHIP-$1^{+/-}$) mice were intercrossed to obtain homozygous progeny (SHIP-$1^{-/-}$). Wild-type (WT) littermates (SHIP-$1^{+/+}$) of same age as SHIP1 KO mice were used as controls. DBA/1J mice (Stock #000670) were also purchased from the Jackson Laboratory.

Chemicals and reagents. Specific SHIP-1 inhibitor 3AC was purchased from Echelon Biosciences (Salt Lake, UT) and suspended in 0.3% Klucel (Sigma-Aldrich, St. Louis, MO) solution. The 3AC suspension was stirred by sonication and sterile filtered before injection. The 0.3% Klucel solution was used as a vehicle control.

Immunoblotting. Splenocytes were isolated from C57BL/6 WT and SHIP1 KO mice, and DBA/1 mice with or without 3AC treatment. The cells were then lysed with RIPA buffer containing Halt™ Protease and Phosphatase Inhibitor Cocktail (Thermo Scientific, Rockford, IL). Total lysates (30 μg/sample) were loaded on an SDS-PAGE gel and transferred onto an Immuno-Blot PVDF membrane (Bio-Rad, Hercules, CA). The membranes were first blocked and then probed with antibodies in TBS (20 mM Tris and 150 mM NaCl) containing 0.1% Tween-20 and 5% skim milk. Antibodies against SHIP-1 (P1C1) (sc-8425) and β-Actin (2A3) were purchased from Santa Cruz Biotechnology (Dallas, TX). Blots were developed by using a goat anti-mouse IgG antibody conjugated IRDye 800CW and imaged with an Odyssey imager (LI-COR, Lincoln, NE).

Flow cytometry analysis. Peripheral blood (PB) samples were collected from the retro-orbital sinus of mice on the indicated days. Bone marrow (BM) of femurs and tibiae and spleens were isolated from sacrificed mice. Following treatment with red blood cell lysing buffer (Sigma-Aldrich) and filtration through a nylon mesh, peripheral blood mononuclear cells (PBMCs), splenocytes, and whole BM cells were isolated and suspended in phosphate-buffered saline (PBS) containing 2% FBS. These cells were labeled with fluorophore-conjugated antibodies and subjected to flow cytometry. All antibodies used in flow cytometry were purchased from BioLegend (San Diego, CA): Alexa Fluor 488 anti-mouse CD11b, APC anti-mouse Gr-1, PE anti-mouse CD3e, APC/Cy7 anti-mouse B220, Alexa Flour 488 anti-mouse CD4, and APC anti-mouse CD25. 4',6-Diamidino-2-Phenylindole (DAPI) was used to exclude DAPI+ dead cells during flow cytometry analysis. Data were acquired using LSR II flow cytometer (BD Biosciences) and analyzed with FlowJo software (FlowJo, Ashland, OR).

Statistical analysis. Data are shown as the mean values±standard error of the mean (SEM). The significance of difference was calculated with unpaired two-tailed Student's t-test or one-way ANOVA when comparing more than 2 groups by using GraphPad Prism (GraphPad Software, Inc., La Jolla, CA). P values less than 0.05 were considered to be statistically significant.

Results

Expansion of MDSCs and Tregs in Peripheral Tissues and BM of SHIP1 KO Mice

To assess the effect of loss of SHIP-1 on immune regulatory cells, the frequency of MDSCs and Tregs in the blood, spleen, and BM of SHIP1 KO mice were examined in comparison to their WT littermates. PBMCs, splenocytes, and BM cells were isolated and stained with antibodies against common mouse MDSC markers, CD11b and Gr-1.

Both the blood and spleen of SHIP1 KO mice contained markedly higher numbers of MDSCs compared to WT mice (FIG. 1A and FIG. 1B). Although not as dramatically different as in the peripheral blood and spleen, MDSCs in the BM of SHIP1 KO mice also increased significantly compared to WT mice (FIG. 1C). The number of regulator T cells (Tregs), defined as CD4+CD25+[81] in blood and spleen, were then analyzed. Compared with WT mice, SHIP1 KO mice had significantly higher percentage of Tregs in spleen but not in peripheral blood (FIG. 1D and FIG. 1E). Both MDSCs and Tregs suppress CD4+ T cell proliferation and function, which promotes an immunosuppressive environment in tumor and autoimmune disease.[82] Thus, these data suggest that loss of SHIP-1 may induce an immunosuppressive microenvironment through expansion of regulatory cell populations in both BM and peripheral tissues.

Figure 2:
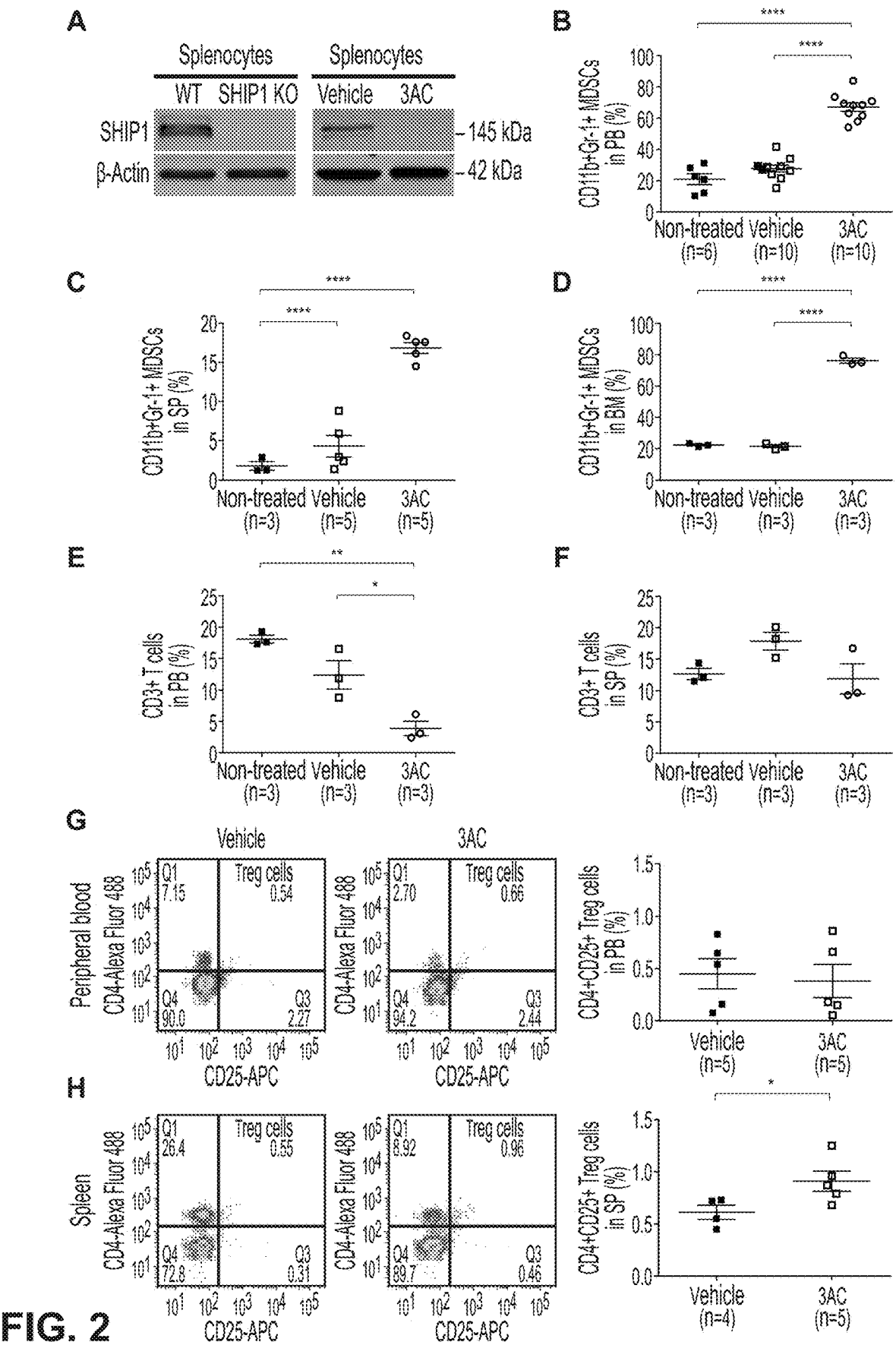
FIG. 2 illustrates that 3AC treatment induces depletion of SHIP-1 protein and mediates MDSC and Treg expansion in vivo.

Expansion of MDSCs and Tregs in Peripheral Tissues and BM Following SHIP-1 Inhibition In Vivo Since temporal inhibition of SHIP-1 by a small molecule specific inhibitor 3AC reduces protein stability and induces protein degradation in cells,[83] the effect of 3AC on the population of MDSCs and T cells in DBA/1 mice were examined, as DBA/1 mice are commonly used in collagen-induced arthritis (CIA) mouse models. As shown in FIG. 2A, after 3AC was injected i.p. daily into DBA/1 mice for 7 days, the resulting depletion of SHIP-1 in splenocytes of 3AC-treated mice was comparable to that in SHIP1 KO mice. Similar as in SHIP1 KO mice, an increase of MDSCs was also observed in peripheral blood (PB), spleen (SP), and BM of 3AC-treated DBA/1 mice (FIG. 2B-D). Interestingly, a significant reduction in CD3+ T cells was found in the PB (FIG. 2E). However, the frequency of CD4+CD25+ Tregs in PB remained unchanged in 3AC-treated mice compared to vehicle treated control mice (FIG. 2G). Combined, these results suggested a higher ratio of Tregs in the peripheral blood of 3AC-treated mice. A similar frequency of CD3+ T cells was found in the SP between the groups (FIG. 2F) but a significantly elevated level of Tregs in 3AC-treated mice compared to vehicle control mice (FIG. 2H). These results suggested a higher ratio of Tregs in the spleen of 3AC-treated mice. These findings are in agreement with previously reported results by us and others,[84,85,86] and suggest that in vivo SHIP-1 inhibition may maintain an enhanced immunosuppressive microenvironment through the expansion of both MDSCs as well as Tregs. Thus, 3AC treatment of DBA/1 mice resulted in expansion of MDSC and Treg cells similar to that described earlier in SHIP1 KO mice and in 3AC-treated C57BL/6 WT mice.[87]

Example 2 Attenuation of Rheumatoid Arthritis in Mice

The purpose of the present study was to investigate the effect of 3AC-induced in vivo expansion of regulatory cells including both MDSCs and Tregs would attenuate autoimmune arthritis in mice using a collagen-induced inflammatory arthritis (CIA) mouse model.

Materials and Methods

In addition to the Materials and Methods described in Example 1, the following were used in the present study.

Real-time PCR. Total RNA was isolated from splenocytes of vehicle- or 3AC-injected CIA mice at day 21 using Trizole reagent (Invitrogen, Waltham, MA). First-strand cDNA was synthesized by iScript Advanced cDNA Synthesis kit (Bio-Rad, Hercules, CA) according to the manufacturer's instructions. PrimePCR™ PCR primers for mouse IL-1β and IL-18 were also purchased from Bio-Rad. For quantitative analysis of gene expression, real-time PCR was performed using iTaq Universal Supermix in a CFX Connect real-time PCR detection system (Bio-Rad). Relative gene expression level was expressed by the fold increase over control sample. GAPDH gene was used as internal control to validate the amount of total transcript.

Collagen-induced arthritis (CIA) in mice. Male and female DBA/1 mice of 8-10 weeks old were injected at the base of the tail with total 100 μL complete Freund's adjuvant (CFA) emulsion containing 200 μg chicken collagen type II (Cn II) (Chondrex, Redmond, WA) on day 0 as a first immunization. Cn II in incomplete Freund's adjuvant (ICFA) were injected i.d. on day 21 as a second immunization. For C57BL/6 WT and SHIP1 KO mice (male and female of 8-10 weeks old littermates), CFA were mixed with 200 μg Cn II and 250 μg M. tuberculosis (MTB) (Chondrex) in the first immunization. Cn II in ICFA were injected on day 21 as a second immunization.[88,89] In a prevention model, the mice were pre-treated with 3AC or vehicle control daily via i.p. injection 7 days prior to the first immunization. In an intervention model, the mice were treated with 3AC or vehicle control daily via i.p. injection 7 days after the second immunization. The mice were given 3AC at 60 μM final concentration. Assessment of development and severity of CIA in mice was carried out using an established mouse scoring system for arthritis.[90] Briefly, clinical score including the assessment of joints for evidence of arthritis in knees, ankles, and digits was performed at day 21 and up to day 70. The score of each limb were totaled and designated as arthritis score. Inflammatory arthritis was expected to fully develop between day 40 and 60 after first immunization at a 70-100% of incidence rate based on our preliminary studies.

Histopathology of CIA. For histological analysis, mice were sacrificed at designated timepoints. Limbs were collected, fixed, decalcified and paraffin embedded. Sections were stained with hematoxylin/eosin (H&E), Safranin O/fast green and toluidine blue to examine cellularity, cartilage damage and bone erosion, respectively. For X-ray imaging, fixed limbs were scanned with Faxitron cabinet X-ray system (Tucson, AZ) before histological analysis. Adoptive transfer of MDSCs in CIA mice. Isolation of CD11b+Gr-1+ MDSCs from spleens of normal mice and spleens of 3AC-treated mice was done on an Influx cell sorter (BD). One day prior to each immunization to induce CIA, a total of 8×10⁵ MDSCs in 0.5 mL PBS were injected via tail vein into the recipient DBA/1 mice.

Results

Prevention of CIA in Mice by Inhibition of SHIP-1 Through 3AC Pretreatment

Figure 3:
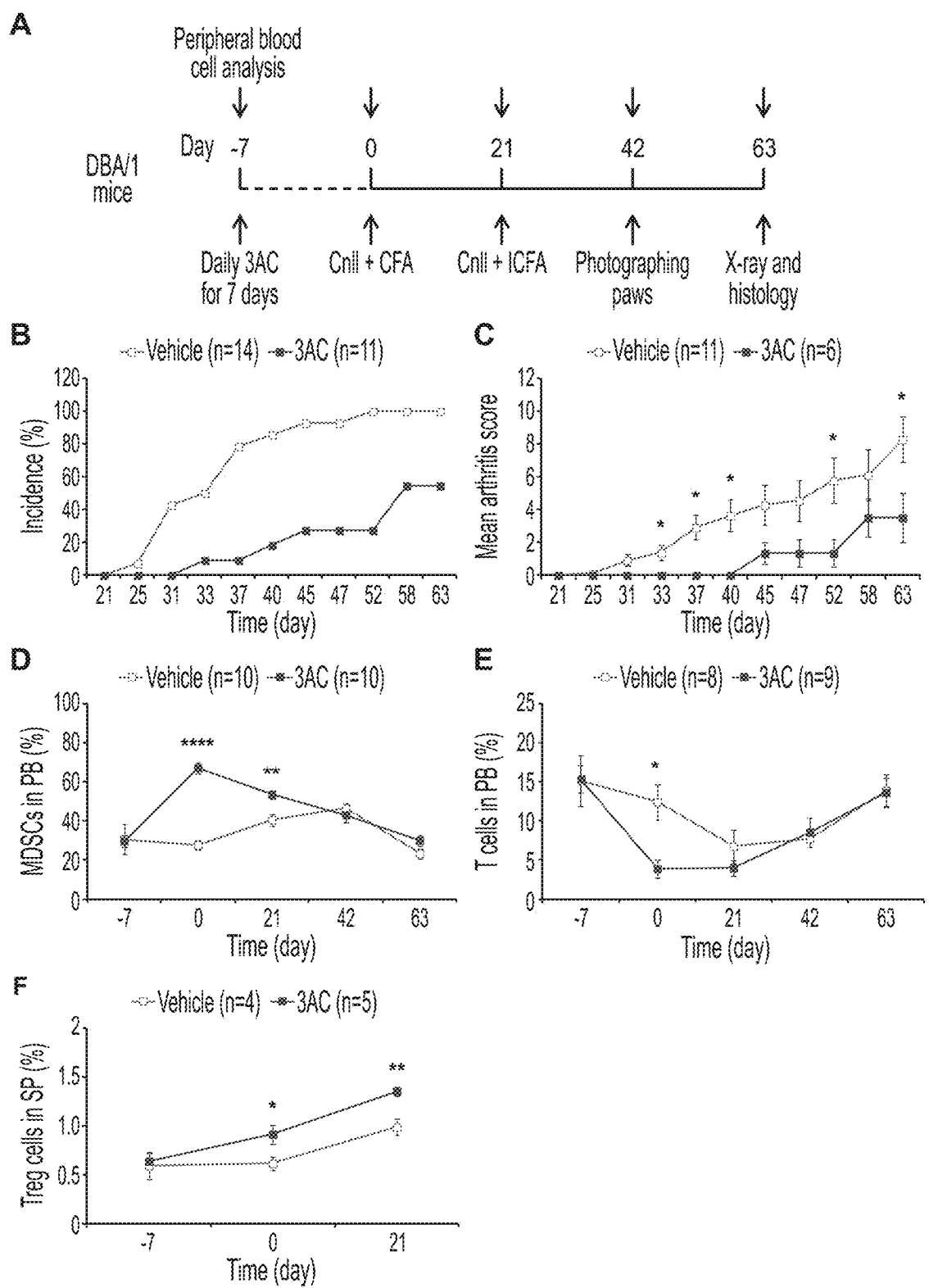
FIG. 3 shows the prevention of collagen-induced inflammatory arthritis (CIA) in mice by inhibition of SHIP-1 in vivo through 3AC pre-treatment.

To assess if 3AC-induced in vivo expansion of regulatory cells including both MDSCs and Tregs would attenuate autoimmune arthritis in mice, DBA/1 mice were injected daily with 3AC for 7 days prior to CIA induction (FIG. 3A). A significant delay of CIA onset (FIG. 3B) and a significant reduction in severity of CIA (FIG. 3C) in 3AC pre-treated mice were observed compared with vehicle-treated control mice, as assessed by comparing clinical scores described earlier. To illustrate the effect of 3AC on MDSCs and T cells during the course of CIA development and progression, their numbers were examined in the peripheral blood of 3AC-injected mice and compared to control mice. As expected, administration of 3AC significantly increased MDSCs (FIG. 3D), and decreased CD3+ T cells (FIG. 3E) till day 21. However, 3AC-induced expansion of MDSCs and suppression of T cells diminished beyond day 21 suggesting a transient effect 3AC. Further, SHIP-1 inhibitor treated mice had higher number of Tregs in the spleen following 3AC injection (FIG. 3F). Since interleukin-1 (IL-1) signaling is critically required for the early programming of Th17 cell lineage and Th17 cell-mediated autoimmunity,[91] and IL-18 differentially regulates distinct subsets of T cells during both homeostatic and inflammatory conditions,[92] real-time PCR was performed to quantify gene expression levels of both IL-1 and IL-18 at day 21 in peripheral blood cells and splenocytes. No difference was found in the gene expression levels in the splenocytes between CIA mice and CIA mice pre-treated with 3AC (data not shown). The gene expression level was not detectable in the peripheral blood cells for either cytokine (data not shown). We also tested gene expression of mouse FoxP3, which is a crucial transcriptional regulator for the development and inhibitory function of Tregs. The expression level was not detectable in either blood or spleen cells (data not shown).

Taken together, these results suggest that SHIP-1 inhibition in vivo induces transient expansion of MDSCs at relatively early time point after injection, and this expansion of MDSCS and Tregs is able to blunt CIA development and progression in mice.

Figure 4:
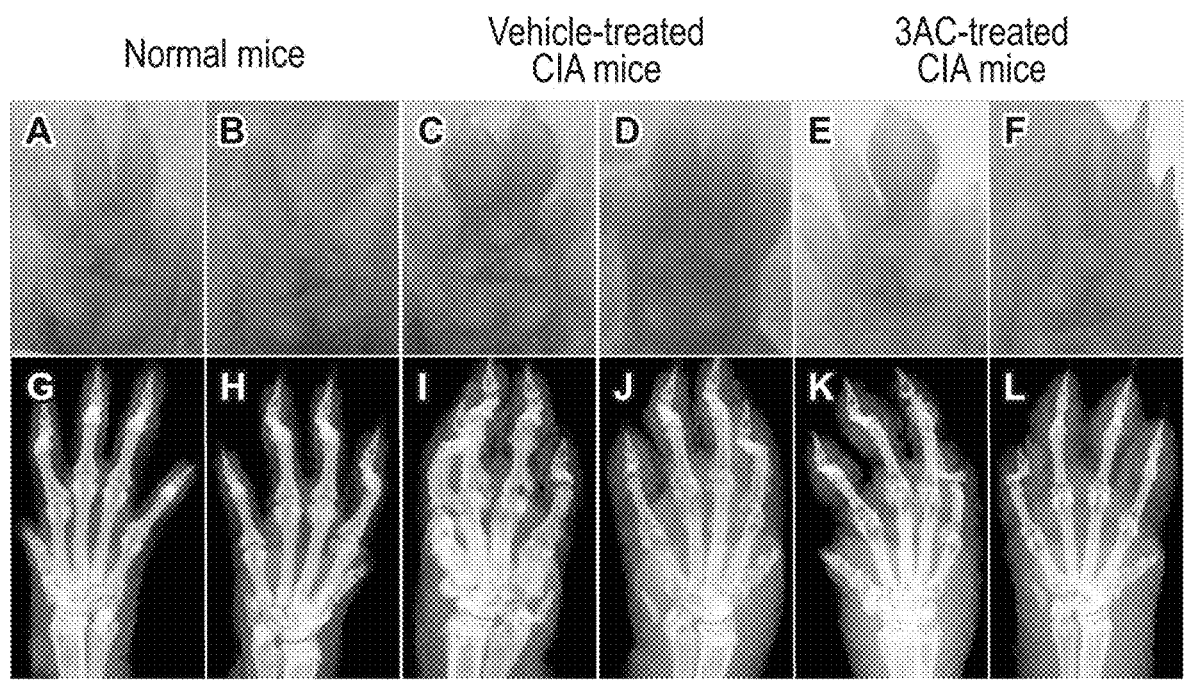
FIG. 4 shows a photographic and radiographic assessment of CIA in mice with 3AC pre-treatment.

Radiographic and Histopathologic Assessment of CIA in Mice With 3AC Pretreatment Since increase of arthritis score and destruction of bone could be independent processes,[93] mouse paws were photographed at day 42 and performed X-ray analysis at day 63 to assess development of CIA in mice. Compared to a pair of front paws of non-CIA normal control mice (FIG. 4A and FIG. 4B) in photographic assessment, visibly swollen and reddish front paws indicating severe inflammation were apparent in CIA-induced mice (FIG. 4C and FIG. 4D) but were much less so in 3AC-treated mice (FIG. 4E and FIG. 4F). Compared to the pair of front paws of non-CIA normal control mice (FIG. 4G and FIG. 4H) in radiographic assessment, misalignment between proximal phalanges and metacarpals, bone erosion, as well as destruction of joint cartilage of several digits were apparent in CIA-induced mice (FIG. 4I and FIG. 4J) but were nearly absent in 3AC-treated mice (FIG. 4K and FIG. 4L). Thus, clinical manifestations of RA as assessed by radiographic evaluation confirmed that inhibition of SHIP-1 in vivo protects against CIA in mice.

Figure 5:
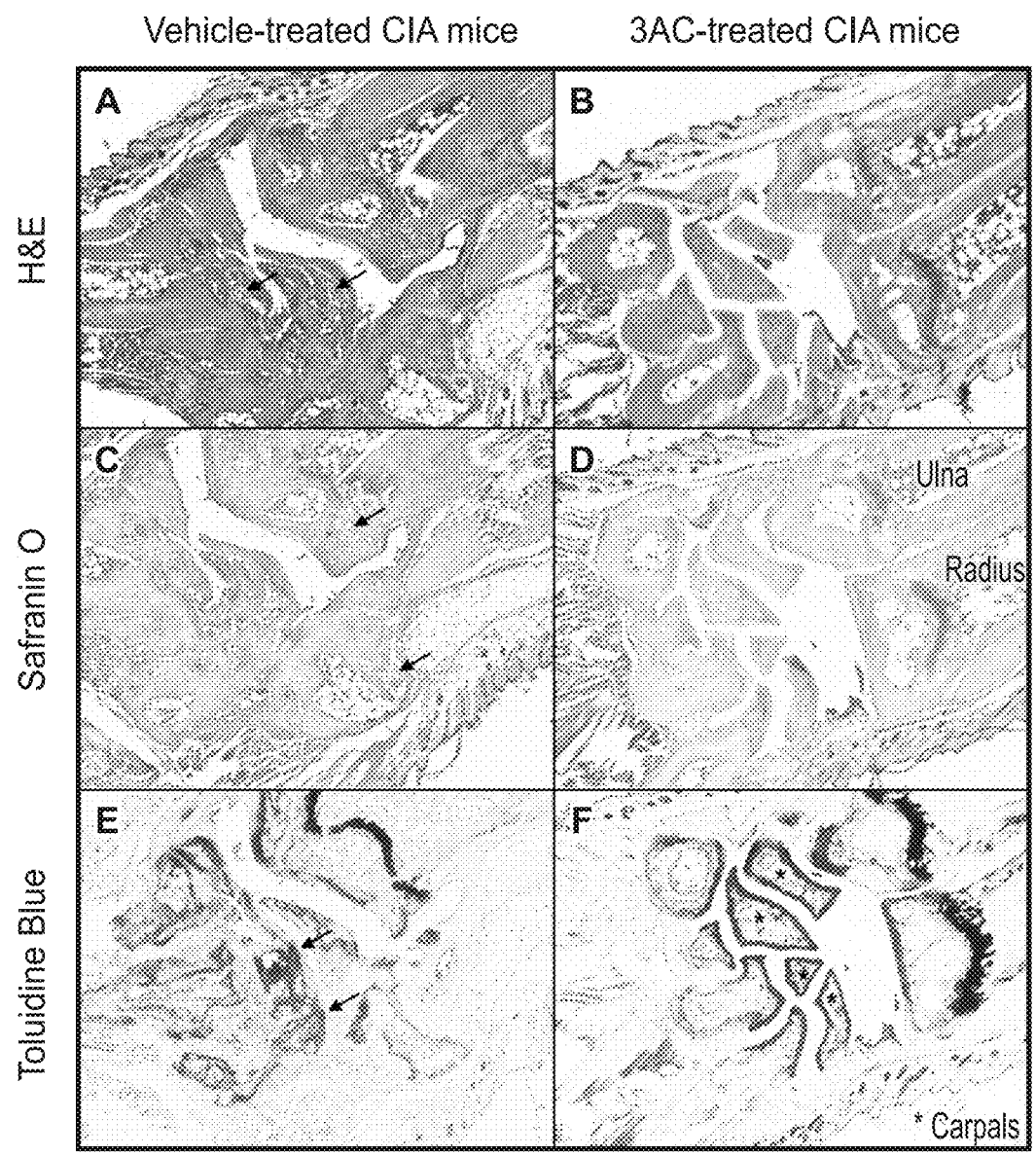
FIG. 5 shows the histopathologic assessment of CIA in mice with 3AC pretreatment.

Next, hematoxylin and eosin (H&E) staining was carried out to evaluate inflammatory cell infiltration in the wrist joint area of the front paws. As shown in FIG. 5A and FIG. 5B, significantly more inflammatory cells (black arrows) could be seen in the vehicle-treated CIA mice than in the 3AC-treated CIA mice. Histological staining of proteoglycan in cartilage with Safranin O, where cartilages stain orange color, was also carried out to evaluate cartilage destruction in the wrist joint area of the front paws. As shown in FIG. 5C and FIG. 5D, much less cartilage staining (black arrows) was seen in the vehicle-treated CIA mice than in the 3AC-treated CIA mice. Finally, histological staining of mineralized bone with Toluidine Blue solution, where bones stain dark blue color, was carried out to evaluate bone erosion in the wrist joint area of the front paws. As shown in FIG. 5E and FIG. 5F, carpal bone erosion (black arrows) was apparent in the vehicle-treated mice with CIA-induction, but not in the 3AC-treated mice with CIA-induction. These results indicate that inhibition of SHIP-1 in vivo reduced inflammatory cell infiltration in the arthritic joint, reduced cartilage damage and reduced bone erosion.

Intervention of CIA in Mice by SHIP-1 Inhibition During Disease Progression

Figure 6:
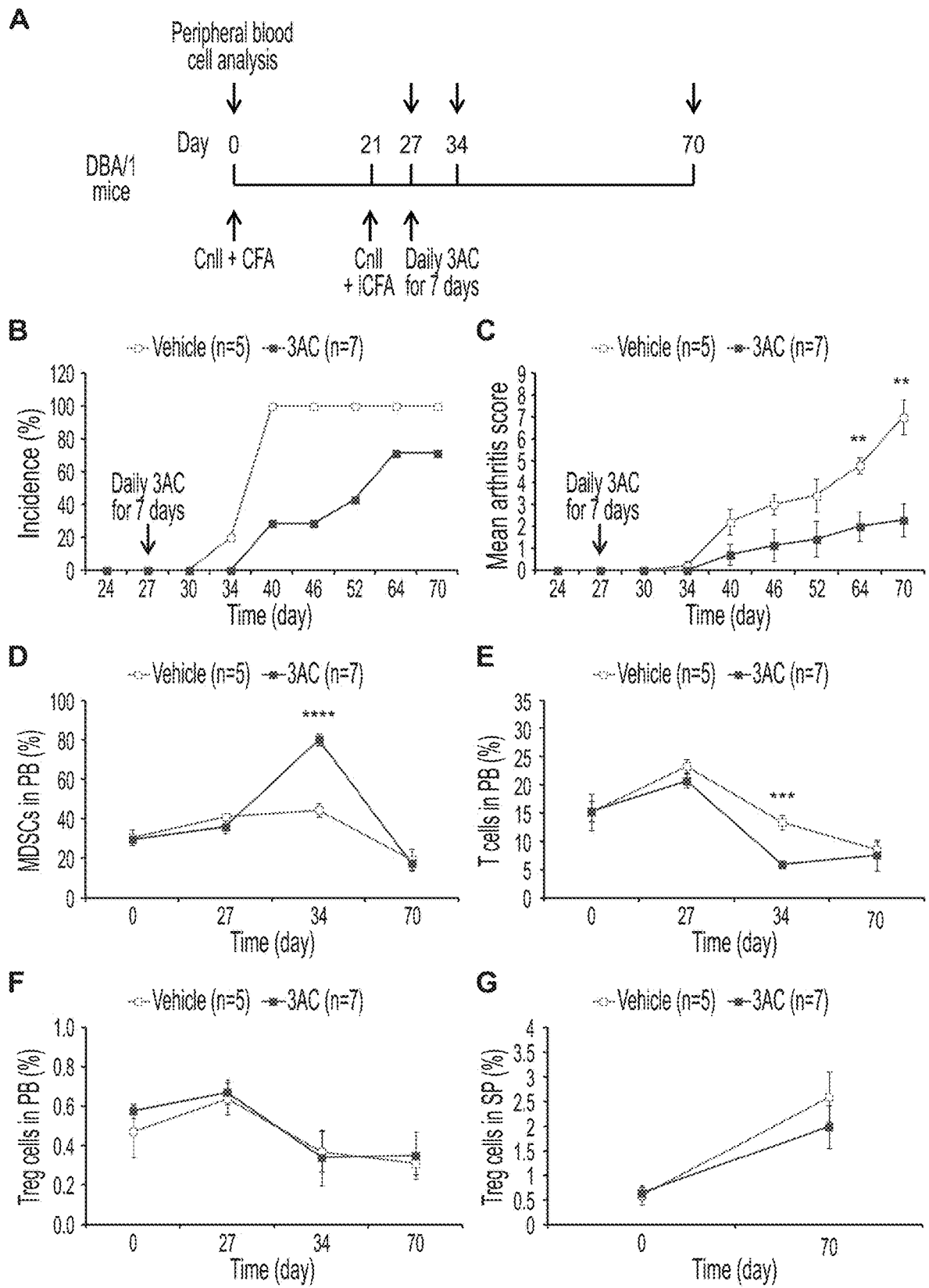
FIG. 6 shows the intervention of CIA in mice by SHIP-1 inhibition during disease progression.

To investigate therapeutic potential of SHIP-1 inhibition after onset of CIA in mice, 3AC was injected one week after the second immunization and monitored the disease development (FIG. 6A). As shown in FIG. 6A and FIG. 6B, administration of 3AC during CIA progression significantly reduced both incidence and severity as assessed by RA clinical scores described above. Significantly but transiently increasing number of MDSCs were found in the peripheral blood of 3AC-treated mice compared to vehicle-treated mice (FIG. 6D). Significantly and transiently decreasing number of total T cell and unchanged number of Tregs suggested that the proportion of Tregs among T cells in the peripheral blood of 3AC-treated mice has increased (FIG. 6E and FIG. 6F). Comparable number of Tregs were found in the spleen of control and 3AC-treated mice at onset and endpoint of the experiment (FIG. 6G). These results show that early intervention of CIA by SHIP-1 inhibition during disease development is also able to attenuate both the incidence and severity.

3AC-Induced MDCSs as Cellular Mediators in Attenuation of CIA in Mice

Figure 7:
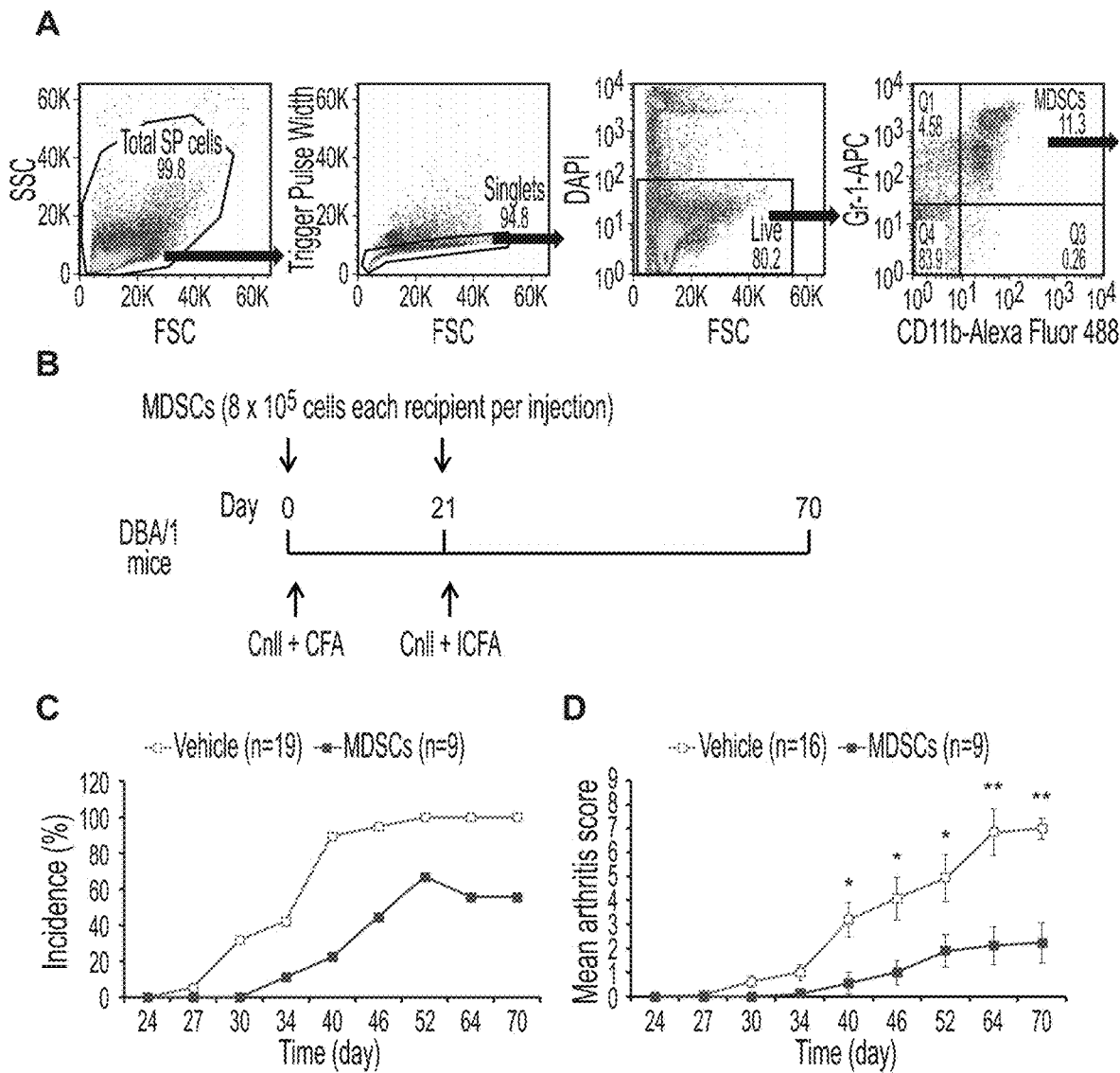
FIG. 7 shows the 3AC-induced MDCSs as cellular mediators in attenuation of CIA in mice.

Previous studies from other investigators have shown that adoptive transfer of MDSCs reduces the severity of CIA in mice and decreases the number of CD4$^+$ T and Th17 cells in lymph node and spleen.[94,95] In our preliminary experiments, we also isolated MDSCs from spleens of normal DBA/1 mice. Transplantation of the normal spleen MDSCs with $8×10^5$ cells each recipient one day before each immunization dampened CIA development in DBA/1 mice (data not shown). MDSCs were isolated from spleens of 3AC-treated mice (FIG. 7A) and these cells were transplanted into DBA/1 mice one day before each immunization to induce CIA (FIG. 7B). As shown in FIG. 7C and FIG. 7D, adoptive transfer of 3AC-induced MDSCs successfully blunted CIA development reducing both the incidence and severity as assessed by RA clinical scores described above. These results suggest that the 3AC-induced MDSCs are one of the cellular mediators in attenuating CIA in mice, and that 3AC-induced MDSCs appeared qualitatively comparable with normal MDSCs in dampening CIA development in DBA/1 mice.

Exacerbation of CIA in SHIP1 KO Mice

Figure 8:
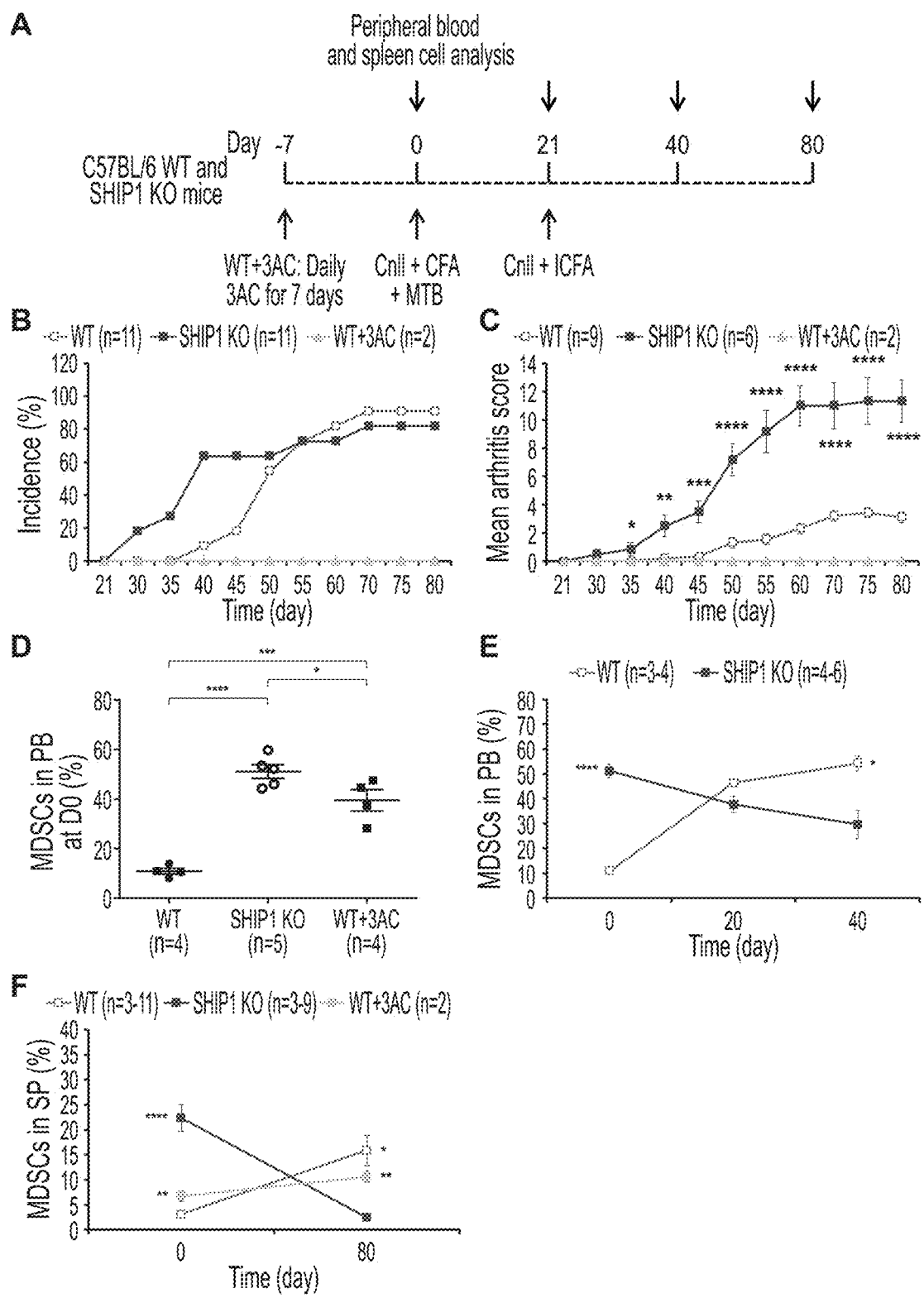
FIG. 8 shows the exacerbation of CIA in SHIP1 KO mice.

The present study examined whether global genetic deletion of SHIP-1 in mice would render resistance to CIA induction. Surprisingly, SHIP1 KO mice had higher incidence and severity compared with C57BL/6 WT mice and WT mice injected with 3AC (FIG. 8A-C). As expected, it took longer (30-40 days) for C57BL/6 WT mice to develop CIA compared with DBA/1 mice (20-30 days).[96] It is worth noting that, despite SHIP-1 KO mice initially having many more MDSCs in both peripheral blood and spleen, the number of MDSCs in SHIP1 KO mice decreased precipitously during CIA development, while MDSCs in WT mice increased steadily (FIG. 8D-F). In additional experiments, SHIP1 KO mice were also treated with the inhibitor 3AC, but the treatment did not improve the incidence and severity of CIA in these mice (data not shown). Further studies are warranted to clarify whether global genetic deletion of SHIP-1 results in production of defective MDSCs or rapid depletion of functional MDSCs under pathological conditions, and that lack of functional MDSCs exacerbates CIA in mice.

Discussion

Current therapies of RA alleviate symptoms and delay disease progression. However, there still remains a significantly unmet clinical need for the development of novel treatment strategies. MDSCs and Tregs play a critical role in the maintenance of immunologic homeostasis and in the prevention of autoimmune disorders. Over the past years, lipid phosphatase SHIP-1 has been recognized as a key regulator of MDSC and Treg differentiation. Both global gene deletion and chemically induced SHIP-1 deficiency increase immunoregulatory capacity through expansion of MDSCs. Temporal inhibition of SHIP-1 was shown to trigger apoptosis of hematopoietic cancer cells and improves antitumor immunity and survival in mouse models.[97,98,99] SHIP-1 inhibitor treatment was recently reported to reduce body weight and fat content and reverse diet-associated obesity, by attenuating inflammation in the visceral adipose tissue. This was attributed to expansion of IL-4-producing eosinophils, alternatively activated macrophages, and myeloid-derived suppressor cells, and reduction of interferon-γ-producing T cells and NK cells within adipose tissue.[100] In these studies, the small molecule 3AC was identified as a specific inhibitor of SHIP-1, and 3AC treatment expands the MDSCs and impairs the immune system's ability to prime allogeneic T cell responses in mouse models. Hence, SHIP-1 has become an attractive therapeutic target in autoimmune and inflammatory diseases.

In the present disclosure, it was postulated that temporal inhibition of SHIP-1 by 3AC in vivo expands MDSCs and Tregs, and over-production of these regulatory cells suppresses the initiation and progression of autoimmune arthritis in a CIA mouse model. The present disclosure demonstrated that in DBA/1 mice, which are commonly used in the CIA model, 3AC treatment could induce a similar expansion of regulatory cells as in the SHIP-1 KO mice. It is likely that inhibition of SHIP-1 by 3AC directly induces MDSC expansion in vivo, which subsequently suppresses T cell proliferation[101] and promotes Treg differentiation.[102,103,104]

The present disclosure then examined the potential of induced SHIP-1 deficiency to delay the onset of CIA in a prevention model, in which 3AC was administered prior to CIA induction. As shown in FIG. 2D, the number of MDSCs increased steadily during CIA development from day 0 to day 42 in vehicle-treated mice. This finding is consistent with recent clinical studies in which an increased number of MDSCs were reported in peripheral blood[105] and synovial fluid of RA patients.[106] Thus, the expansion of MDSCs suggests that the immune system may be deliberately producing MDSCs in an effort to counter the initiation and progression of the autoimmune arthritis. As shown in the same FIG. 2D, the number of MDSCs has already reached its highest level in 3AC-treated mice at day 0 before CIA induction. These significantly higher levels of MDSCs in 3AC pre-treated mice at day 0 and day 21 coincided with the significantly lower levels of total T cells in the peripheral blood (FIG. 2E), and significantly higher levels of Tregs in the spleen (FIG. 2F) at these 2 time points. Combined, the high levels of regulatory cells in 3AC-treated mice are likely responsible for the delayed onset and reduced severity of CIA. We next examined the potential of induced SHIP-1 deficiency to intervene the progression of CIA in an intervention model, in which 3AC was administered at day 27, one week after the second immunization of CIA induction. Once again, the significantly higher level of MDSCs and the relatively higher ratio of Tregs among T cells in the peripheral blood coincided with a delayed onset and reduced severity of CIA. Finally, adoptive transfer of 3AC-induced MDSCs showed similar efficacy as with 3AC injection, indicating that the MDSCs are the cellular mediators for the observed amelioration of CIA in mice. Beyond 70-80 days in DBA/1 mouse model, the self-resolving nature of CIA in these mice would confound the potential of 3AC in reversal of established disease. Also, regeneration of eroded bone and damaged cartilage will likely require participation of mesenchymal stem and other committed progenitor cells, thus more than 3AC-induced immune suppression.

Previous studies show that SHIP-1 regulates the reciprocal development of Tregs and Th17 cells,[107,108] and that SHIP-1 deficiency exhibits delayed GvHD through the expansion of regulatory cells in mouse disease models.[109,110,111] These studies raise the possibility that in addition to expansion of MCSDs, decreased ratio between Th17 cells and Tregs may have also contributed to the improvement of CIA in mice. However, gene expression level of IL17A specific for Th17 cells and FoxP3 specific for Tregs was extremely low in either splenocytes or peripheral blood cells isolated from CIA mice at different stages, so that no definitive conclusion could be drawn regarding Th17/Treg ratio.

Next, the present disclosure examined whether global gene deletion in SHIP1KO mice would render resistance to CIA induction. Surprisingly, SHIP1 KO mice more readily developed CIA than congenic C57BL/6 WT mice. Earlier characterization of SHIP1 KO mice showed that these mice develop a severe lung pathology related to a myeloid consolidation of the alveolar spaces.[112] Interestingly, SHIP-1 inhibition by 3AC did not cause the pulmonary myeloid infiltration as seen in SHIP-1 KO mice.[113] Further a study by Zhou et al. (2006)[114] suggested that osteoclastogenesis and periarticular bone erosions were increased in SHIP-1 KO mice, when they were transferred arthrogenic serum from K/BxN mice to induced inflammatory arthritis. Although this mouse model is invaluable in elucidating the contribution of discrete innate immune pathways, in particular tissue damage, the serum transfer induces aggressive disease progression and is not associated with a T- and B-cell response.[115]

The role of MDSCs in autoimmune diseases are not completely understood. A study demonstrated that MDSC subset with a neutrophilic/granulocytic phenotype from the cord blood of neonatal infection patients could suppress the secretion of IL-17 from CD4+ T cells.[116] Consistent with that report, another study showed that MDSC derived from patients infected with *Pseudomonas aeruginosa* also dramatically dampened the synthesis and release of IL-17 produced by CD4+ T cells.[117] In graft versus host disease patients, increased G-MDSC efficiently dampened Th17 cell response.[118] These findings demonstrate that MDSC can suppress Th17 cell response. On the other hand, there are data from experimental autoimmune encephalomyelitis[119] and CIA mouse models[120,121] suggesting that MDSCs promote inflammation by inducing Th17 differentiation. This inconsistency may be a result of the heterogeneous nature of MDSC and suggests that the inhibitory functions of MDSC may be dictated by the particular disease or microenvironment. However, as mentioned earlier, Th17 specific gene expression remained undetectable in our experiments.

Antitumor effect has become a well-known feature of chemical inhibition of SHIP-1. Treatment of 3AC increases apoptosis of hematopoietic cancer cells in vitro and administration of 3AC reduces tumor cell growth in xenograft model of multiple myeloma without association with severe inflammation of peripheral tissues.[122,123] In addition, a recent report showed that pulsatile inhibition of SHIP-1 reduced the growth of both hematological and solid tumors through increased NK and T cell responsiveness to tumor in mice.[124] The potential therapeutic role of MDSCs in autoimmune arthritis has only been suggested by other investigators over the past few years.[125,126,127] The data presented in the instant disclosure shows that inhibition of SHIP-1 in vivo by a chemical inhibitor 3AC expands MDSCs in vivo and attenuates CIA in mice.

Conclusion

The above-described results indicate that MDSCs have a remarkable ability to suppress the immune responses of a T-cell subset that causes RA. The efficacy of exogenous MDSCs in inhibiting RA in the mouse model suggests that MDSCs could be harnessed as a cellular therapy for RA and using autologous MDSCs to dampen the autoimmune system can be a promising alternative to alleviate the disease and to avoid chronic use of the current DMARDs.

REFERENCES

[1]Boissier, M. C., et al. (2012). "*Rheumatoid arthritis: from autoimmunity to synovitis and joint destruction.*" J. Autoimmun. 39: 222-228.

[2] Klareskog, L., et al. (2009). "*Rheumatoid arthritis.*" Lancet 373: 659-672.

[3] Alamanos, Y. and Drosos, A. A. (2005). "*Epidemiology of adult rheumatoid arthritis.*" Autoimmun. Rev. 4:130-136.

[4] Alamanos, Y., et al. (2006). "*Incidence and prevalence of rheumatoid arthritis, based on the 1987 American College of Rheumatology criteria: a systematic review.*" Semin. Arthritis Rheum. 36: 182-188.

[5] Birnbaum, H., et al. (2010). "*Societal cost of rheumatoid arthritis patients in the US.*" Curr. Med. Res. Opin. 26: 77-90.

[6] Dadoun. S., et al. (2013). "*Mortality in rheumatoid arthritis over the last fifty years: systematic review and meta-analysis.*" Joint Bone Spine. 80: 29-33.

[7] Aletaha, D., et al. (2010). "*2010 rheumatoid arthritis classification criteria: an American College of Rheumatology/European League Against Rheumatism collaborative initiative.*" Ann Rheum Dis. 69: 1580-1588.

[8] Singh, J. A., et al. (2016). "*2015 American College of Rheumatology Guideline for the Treatment of Rheumatoid Arthritis.*" Arthritis Rheumatol. 68: 1-26.

[9] Pelechas, E., et al. (2019). "*Golimumab for Rheumatoid Arthritis.*" J. Clin. Med. 2019; 8.

[10] Aaltonen, K. J., et al. (2012). "*Systematic review and meta-analysis of the efficacy and safety of existing TNF blocking agents in treatment of rheumatoid arthritis.*" PLOS One. 7: e30275.

[11] Scott, L. J. (2017). "*Tocilizumab: A Review in Rheumatoid Arthritis.*" Drugs. 77: 1865-1879.

[12] Papagoras, C. and Drosos, A. A. (2011). "*Abatacept: a biologic immune modulator for rheumatoid arthritis.*" Expert Opin. Biol. Ther. 11: 1113-1129.

[13] Schioppo, T. and Ingegnoli, F. (2017). "*Current perspective on rituximab in rheumatic diseases.*" Drug Des Devel Ther. 11: 2891-2904.

[14] O'Shea, J. J., et al. (2015). "*The JAK-STAT pathway: impact on human disease and therapeutic intervention.*" Annu. Rev. Med. 66: 311-328.

[15] Dougados, M., et al. (2017). "*Baricitinib in patients with inadequate response or intolerance to conventional synthetic DMARDs: results from the RA-BUILD study.*" Ann. Rheum. Dis. 76: 88-95.

[16] Singh, J. A., et al. (2009). "*A network meta-analysis of randomized controlled trials of biologics for rheumatoid arthritis: a Cochrane overview.*" CMAJ 181: 787-796.

[17] Rubbert-Roth, A. and Finckh, A. (2009). "*Treatment options in patients with rheumatoid arthritis failing initial TNF inhibitor therapy: a critical review.*" Arthritis Res Ther 11 Suppl 1: S1.

[18] Gu, T., et al. (2016). "*Comparing Biologic Cost Per Treated Patient Across Indications Among Adult US Managed Care Patients: A Retrospective Cohort Study.*" Drugs Real World Outcomes, 3: 369-381.

[19] Isselbacher, et al. (1996). HARRISON'S PRINCIPLES OF INTERNAL MEDICINE, 13 ed., 1814-1882.

[20] THE MERCK MANUAL OF DIAGNOSIS AND THERAPY, (2011). 19th Edition, published by Merck Sharp & Dohme Corp., (ISBN 978-0-911910-19-3).

[21] THE ENCYCLOPEDIA OF MOLECULAR CELL BIOLOGY AND MOLECULAR MEDICINE, Robert S. Porter et al. (eds.), published by Blackwell Science Ltd., 1999-2012 (ISBN 9783527600908).

[22] MOLECULAR BIOLOGY AND BIOTECHNOLOGY: A COMPREHENSIVE DESK REFERENCE, (1995). Robert A. Meyers (ed.), published by VCH Publishers, Inc. (ISBN 1-56081-569-8).

[23] IMMUNOLOGY, (2006). Werner Luttmann, published by Elsevier.

[24] JANEWAY'S IMMUNOBIOLOGY, (2014). Kenneth Murphy, Allan Mowat, Casey Weaver (eds.), Taylor & Francis Limited, (ISBN 0815345305, 9780815345305).

[25] LEWIN'S GENES XI, (2014). published by Jones & Bartlett Publishers (ISBN-1449659055).

[26] Michael Richard Green and Joseph Sambrook, (2012). MOLECULAR CLONING: A LABORATORY MANUAL, 4th ed., Cold Spring Harbor Laboratory Press, Cold Spring Harbor, N.Y., USA (ISBN 1936113414).

[27] Davis et al., (2012). BASIC METHODS IN MOLECULAR BIOLOGY, Elsevier Science Publishing, Inc., New York, USA (ISBN 044460149X).

[28] LABORATORY METHODS IN ENZYMOLOGY: DNA, (2013). Jon Lorsch (ed.) Elsevier (ISBN 0124199542).

[29] CURRENT PROTOCOLS IN MOLECULAR BIOLOGY (CPMB), (2014). Frederick M. Ausubel (ed.), John Wiley and Sons (ISBN 047150338X, 9780471503385).

[30] CURRENT PROTOCOLS IN PROTEIN SCIENCE (CPPS), (2005). John E. Coligan (ed.), John Wiley and Sons, Inc.

[31] CURRENT PROTOCOLS IN IMMUNOLOGY (CPI) (2003). John E. Coligan, A D A M Kruisbeek, David H Margulies, Ethan M Shevach, Warren Strobe, (eds.) John Wiley and Sons, Inc. (ISBN 0471142735, 9780471142737).

[32] Boissier, M. C., et al. (2012). "*Rheumatoid arthritis: from autoimmunity to synovitis and joint destruction.*" J. Autoimmun. 39: 222-228.

[33] Turesson, C., et al. (2008). "*Cardiovascular co-morbidity in rheumatic diseases.*" Vasc. Health Risk Manag. 4: 605-614.

[34] Singh, J. A., et al. (2009). "*A network meta-analysis of randomized controlled trials of biologics for rheumatoid arthritis: a Cochrane overview.*" CMAJ 181: 787-796.

[35] Rubbert-Roth, A. and Finckh, A. (2009). "*Treatment options in patients with rheumatoid arthritis failing initial TNF inhibitor therapy: a critical review.*" Arthritis Res Ther 11 Suppl 1: S1.

[36] Bronte, V., et al. (2003). "*L-arginine metabolism in myeloid cells controls T-lymphocyte functions.*" Trends Immunol. 24: 302-306.

[37] Kusmartsev, S. and Gabrilovich, D. I. (2003). "*Inhibition of myeloid cell differentiation in cancer: the role of reactive oxygen species.*" J. Leukoc. Biol. 74: 186-196.

[38] Dilek, N., et al. (2012). "*Myeloid-derived suppressor cells: mechanisms of action and recent advances in their role in transplant tolerance.*" Front Immunol. 3: 208.

[39] Gabrilovich, D. I. and Nagaraj, S. (2009). "*Myeloid-derived suppressor cells as regulators of the immune system.*" Nat. Rev. Immunol. 9: 162-174.

[40] Wood, K. J., et al. (2012). "*Regulatory immune cells in transplantation.*" Nat. Rev. Immunol. 12: 417-430.

[41] Ioannou, M., et al. (2012). "*Crucial role of granulocytic myeloid-derived suppressor cells in the regulation of central nervous system autoimmune disease.*" J. Immunol. 188: 1136-1146.

[42] Jiao, Z., et al. (2013). "*Increased circulating myeloid-derived suppressor cells correlated negatively with Th17 cells in patients with rheumatoid arthritis.*" Scand. J. Rheumatol. 42: 85-90.

[43] Kurko, J., et al. (2014). "*Identification of myeloid-derived suppressor cells in the synovial fluid of patients with rheumatoid arthritis: a pilot study.*" BMC Musculoskelet. Disord. 15: 281.

[44] Youn, J. I., et al. (2008). "*Subsets of myeloid-derived suppressor cells in tumor-bearing mice.*" J. Immunol. 181: 5791-5802.

[45] Fujii, W., et al. (2013). "*Myeloid-derived suppressor cells play crucial roles in the regulation of mouse collagen-induced arthritis*." J. Immunol. 191: 1073-1081.

[46] Oduro, K. A. Jr., et al. (2012). "*Myeloid skewing in murine autoimmune arthritis occurs in hematopoietic stem and primitive progenitor cells*." Blood 120: 2203-2213.

[47] Damen, J. E., et al. (1996). "*The 145-kDa protein induced to associate with Shc by multiple cytokines is an inositol tetraphosphate and phosphatidylinositol 3,4,5-triphosphate 5-phosphatase*." PNAS 93 (4): 1689-1693.

[48] Ware, M. D., et al. (1996). "*Cloning and characterization of human SHIP, the 145-kD inositol 5-phosphatase that associates with SHC after cytokine stimulation.*" Blood 88 (8): 2833-2840.

[49] Geier, S. J., et al. (1997). "*The human SHIP gene is differentially expressed in cell lineages of the bone marrow and blood*." Blood 89 (6): 1876-1885.

[50] Hazen, A. L., et al. (2009). "*SHIP is required for a functional hematopoietic stem cell niche*." Blood 113 (13): 2924-2933.

[51] Zippo, A., et al. (2004). "*Identification of Flk-1 target genes in vasculogenesis: Pim-1 is required for endothelial and mural cell differentiation in vitro*." Blood. 103 (12): 4536-4544.

[52] Franke, T. F., et al. (1997). "*Direct regulation of the Akt proto-oncogene product by phosphatidylinositol-3,4-bisphosphate*." Science 275: 665-668.

[53] Rohrschneider, L. R., et al. (2000). "*Structure, function, and biology of SHIP proteins*." Genes Dev. 14: 505-520.

[54] Song, M. S., et al. (2012). "*The functions and regulation of the PTEN tumour suppressor*." Nat. Rev. Mol. Cell Biol. 13: 283-296.

[55] Fernandes, S., et al. (2013). "*Role of SHIP1 in cancer and mucosal inflammation*." Ann. N. Y. Acad. Sci. 1280: 6-10.

[56] Ma, K., et al. (2008). "*PI(3,4,5)P3 and PI(3,4)P2 levels correlate with PKB/akt phosphorylation at Thr308 and Ser473, respectively; PI(3,4)P2 levels determine PKB activity*." Cell Signal 20: 684-694.

[57] Scheid, M. P., et al. (2002). "*Phosphatidylinositol (3,4,5) P3 is essential but not sufficient for protein kinase B (PKB) activation; phosphatidylinositol (3,4)P2 is required for PKB phosphorylation at Ser-473: studies using cells from SH2-containing inositol-5-phosphatase knockout mice*." J. Biol. Chem. 277: 9027-9035.

[58] Collazo, M. M., et al. (2012). "*Lineage extrinsic and intrinsic control of immunoregulatory cell numbers by SHIP*." Eur. J. Immunol. 42: 1785-1795.

[59] Ghansah, T., et al. (2004). "*Expansion of myeloid suppressor cells in SHIP-deficient mice represses allogeneic T cell responses*." J. Immunol. 173: 7324-7330.

[60] Paraiso, K. H., et al. (2007). "*Induced SHIP deficiency expands myeloid regulatory cells and abrogates graft-versus-host disease*." J. Immunol. 178: 2893-2900.

[61] Locke, N. R., et al. (2009). "*SHIP regulates the reciprocal development of T regulatory and Th17 cells*." J. Immunol. 183: 975-983.

[62] Brooks, R., et al. (2010). "*SHIP1 inhibition increases immunoregulatory capacity and triggers apoptosis of hematopoietic cancer cells*." J. Immunol. 184: 3582-3589.

[63] Antignano, F., et al. (2010). "*SHIP is required for dendritic cell maturation*." J. Immunol. 184: 2805-2813.

[64] So, E. Y., et al. (2019). "*Loss of lipid phosphatase SHIP1 promotes macrophage differentiation through suppression of dendritic cell differentiation*." Cancer Biol. Ther. 20(2): 201-211.

[65] Available from various sources, e.g., Echelon Biosciences (Salt Lake City, UT—Product No. B-0341; Caymen Chemical (Ann Arbor, MI)—Item No. 27885; ChemExpress (Shanghai, P.R. China)—Cat. No. HY-19776; ChemScence (Monmouth Junction, NJ)—Cat. No. CS-8067; Glpbio (Montclair, CA)—Cat. No. GC33059; KareBay Biochem (Monmouth Junction, NJ)—Cat. No. KI9456; Sigma-Aldrich—Cat. No. 565835.

[66] Chen, Z., et al. (2015). "*Signalling thresholds and negative B-cell selection in acute lymphoblastic leukaemia*." Nature 521(7552): 357-361.

[67] Gwenny, M. et al. (2012). "*Therapeutic Potential of SH2 Domain-Containing Inositol-5'-Phosphatase 1 (SHIP1) and SHIP2 Inhibition in Cancer*." Mol. Med. 18: 65-75.

[68] Fuhler, G. M., et al. (2012). "*Therapeutic potential of SH2 domain-containing inositol-5'-phosphatase 1 (SHIP1) and SHIP2 inhibition in cancer*." Mol. Med. 18: 65-75.

[69] Viernes, D. R., et al. (2014). "*Discovery and Development of Small Molecule SHIP Phosphatase Modulators*." Medicinal Research Reviews, 34(4): 795-824.

[70] Pedicone, C., et al. (2020). "*Pan-SHIP1/2 inhibitors promote microglia effector functions essential for CNS homeostasis*." J. Cell Sci. 133: 1-13 at Table S1.

[71] Available from Echelon Biosciences (Salt Lake City, UT)—Product No. B-0344.

[72] Brooks, R., et al. (2015). "*Coordinate Expansion of Murine Hematopoietic and Mesenchymal Stem Cell Compartments by SHIPi*." Stem Cells 33: 848-858.

[73] Srivastava, N., et al. (2016). "*A small-molecule inhibitor of SHIP1 reverses age- and diet-associated obesity and metabolic syndrome*." JCI Insight, 1(11): 1-12.

[74] Pedicone, C., et al. (2020). "*Pan-SHIP1/2 inhibitors promote microglia effector functions essential for CNS homeostasis*." J. Cell Sci. 133: 1-13.

[75] Srivastava, N., et al. (2016). "*A small-molecule inhibitor of SHIP1 reverses age- and diet-associated obesity and metabolic syndrome*." JCI Insight 1(11): 1-12.

[76] Gumbleton, M., et al. (2017). "*Dual enhancement of T and NK cell function by pulsatile inhibition of SHIP1 improves antitumor immunity and survival*." Sci Signal 10(500): 1-9.

[77] Hoekstra, E., et al. (2016). "*Lipid phosphatase SHIP2 functions as oncogene in colorectal cancer by regulating PKB activation*." Oncotarget 7: 73525-73540.

[78] Pedicone, C., et al. (2020). "*Pan-SHIP1/2 inhibitors promote microglia effector functions essential for CNS homeostasis*." J. Cell Sci. 133: 1-13.

[79] Id.

[80] Suwa, A., et al. (2009). "*Discovery and functional characterization of a novel small molecule inhibitor of the intracellular phosphatase, SHIP2*." Br. J. Pharmacol. 158, 879-887.

[81] Sakaguchi, S., et al. (1995). "*Immunologic self-tolerance maintained by activated T cells expressing IL-2 receptor alpha-chains (CD25). Breakdown of a single mechanism of self-tolerance causes various autoimmune diseases*." J. Immunol. 155: 1151-1164.

[82] Fujimura, T., et al. (2012). "*Crosstalk between regulatory T cells (Tregs) and myeloid derived suppressor cells (MDSCs) during melanoma growth*." Oncoimmunology 1: 1433-1434.

[83] Brooks, R., et al. (2010). "*SHIP1 inhibition increases immunoregulatory capacity and triggers apoptosis of hematopoietic cancer cells*." J. Immunol. 184: 3582-3589.

[84] Collazo, M. M., et al. (2012). "Lineage extrinsic and intrinsic control of immunoregulatory cell numbers by SHIP." Eur. J. Immunol. 42: 1785-1795.

[85] Collazo, M. M., et al. (2009). "SHIP limits immunoregulatory capacity in the T-cell compartment." Blood 113: 2934-2944.

[86] So, E. Y., et al. (2019). "Loss of lipid phosphatase SHIP1 promotes macrophage differentiation through suppression of dendritic cell differentiation." Cancer Biol. Ther. 20: 201-211.

[87] Brooks, R., et al. (2010). "SHIP1 inhibition increases immunoregulatory capacity and triggers apoptosis of hematopoietic cancer cells." J. Immunol. 184: 3582-3589.

[88] Campbell, I. K., et al. (2000). "Collagen-induced arthritis in C57BL/6 (H-2b) mice: new insights into an important disease model of rheumatoid arthritis." Eur. J. Immunol. 30: 1568-1575.

[89] Fujii, W., et al. (2013). "Myeloid-derived suppressor cells play crucial roles in the regulation of mouse collagen-induced arthritis." J. Immunol. 191: 1073-1081.

[90] Id.

[91] Chung, Y., et al. (2009). "Critical regulation of early Th17 cell differentiation by interleukin-1 signaling." Immunity 30: 576-587.

[92] Harrison, O. J., et al. (2015). "Epithelial-derived IL-18 regulates Th17 cell differentiation and Foxp3(+) Treg cell function in the intestine." Mucosal Immunol. 8: 1226-1236.

[93] van Lent, P. L., et al. (2006). "Fcgamma receptors directly mediate cartilage, but not bone, destruction in murine antigen-induced arthritis: uncoupling of cartilage damage from bone erosion and joint inflammation." Arthritis Rheum. 54: 3868-3877.

[94] Crook, K. R., et al. (2015). "Myeloid-derived suppressor cells regulate T cell and B cell responses during autoimmune disease." J. Leukoc. Biol. 97: 573-582.

[95] Fujii, W., et al. (2013). "Myeloid-derived suppressor cells play crucial roles in the regulation of mouse collagen-induced arthritis." J. Immunol. 191: 1073-1081.

[96] Bessis, N., et al. (2017). "Arthritis models: usefulness and interpretation." Semin. Immunopathol. 39: 469-486.

[97] Brooks, R., et al. (2010). "SHIP1 inhibition increases immunoregulatory capacity and triggers apoptosis of hematopoietic cancer cells." J. Immunol. 184: 3582-3589.

[98] Fuhler, G. M., et al. (2012). "Therapeutic potential of SH2 domain-containing inositol-5'-phosphatase 1 (SHIP1) and SHIP2 inhibition in cancer." Mol. Med. 18: 65-75.

[99] Gumbleton, M., et al. (2017). "Dual enhancement of T and NK cell function by pulsatile inhibition of SHIP1 improves antitumor immunity and survival." Sci Signal 10(500): 1-9.

[100] Srivastava, N., et al. (2016). "A small-molecule inhibitor of SHIP1 reverses age- and diet-associated obesity and metabolic syndrome." JCI Insight 1(11): 1-12.

[101] Dilek, N., et al. (2012). "Myeloid-derived suppressor cells: mechanisms of action and recent advances in their role in transplant tolerance." Front Immunol. 3: 208.

[102] Huang, B., et al. (2006). "Gr-1+CD115+ immature myeloid suppressor cells mediate the development of tumor-induced T regulatory cells and T-cell anergy in tumor-bearing host." Cancer Res. 66: 1123-1131.

[103] Pan, P. Y., et al. (2010). "Immune stimulatory receptor CD40 is required for T-cell suppression and T regulatory cell activation mediated by myeloid-derived suppressor cells in cancer." Cancer Res. 70: 99-108.

[104] Serafini, P., et al. (2008). "Myeloid-derived suppressor cells promote cross-tolerance in B-cell lymphoma by expanding regulatory T cells." Cancer Res. 68: 5439-5449.

[105] Jiao, Z., et al. (2013). "Increased circulating myeloid-derived suppressor cells correlated negatively with Th17 cells in patients with rheumatoid arthritis." Scand. J. Rheumatol. 42: 85-90.

[106] Kurko, J., et al. (2014). "Identification of myeloid-derived suppressor cells in the synovial fluid of patients with rheumatoid arthritis: a pilot study." BMC Musculoskelet. Disord. 15: 281.

[107] Locke, N. R., et al. (2009). "SHIP regulates the reciprocal development of T regulatory and Th17 cells." J. Immunol. 183: 975-983.

[108] Parry, R. V., et al. (2010). "Fine tuning T lymphocytes: a role for the lipid phosphatase SHIP-1." Biochim. Biophys. Acta 1804: 592-597.

[109] Collazo, M. M., et al. (2009). "SHIP limits immunoregulatory capacity in the T-cell compartment." Blood 113: 2934-2944.

[110] Ghansah, T., et al. (2004). "Expansion of myeloid suppressor cells in SHIP-deficient mice represses allogeneic T cell responses." J. Immunol. 173: 7324-7330.

[111] Paraiso, K. H., et al. (2007). "Induced SHIP deficiency expands myeloid regulatory cells and abrogates graft-versus-host disease." J. Immunol. 178: 2893-2900.

[112] Helgason, C. D., et al. (1998). "Targeted disruption of SHIP leads to hemopoietic perturbations, lung pathology, and a shortened life span." Genes Dev. 12: 1610-1620.

[113] Brooks, R., et al. (2010). "SHIP1 inhibition increases immunoregulatory capacity and triggers apoptosis of hematopoietic cancer cells." J. Immunol. 184: 3582-3589.

[114] Zhou, P., et al. (2006). "SHIP1 negatively regulates proliferation of osteoclast precursors via Akt-dependent alterations in D-type cyclins and p27." J. Immunol. 177: 8777-8784.

[115] Asquith, D. L., et al. (2009). "Animal models of rheumatoid arthritis." Eur. J. Immunol. 39: 2040-2044.

[116] Rieber, N., et al. (2013). "Neutrophilic myeloid-derived suppressor cells in cord blood modulate innate and adaptive immune responses." Clin. Exp. Immunol. 174: 45-52.

[117] Rieber, N., et al. (2013). "Flagellin induces myeloid-derived suppressor cells: implications for Pseudomonas aeruginosa infection in cystic fibrosis lung disease." J. Immunol. 190: 1276-1284.

[118] Rieber, N., et al. (2014). "Extracorporeal photopheresis increases neutrophilic myeloid-derived suppressor cells in patients with GvHD." Bone Marrow Transplant. 49: 545-552.

[119] Yi, H., et al. (2012). "Mouse CD11b+Gr-1+ myeloid cells can promote Th17 cell differentiation and experimental autoimmune encephalomyelitis." J. Immunol. 189: 4295-4304.

[120] Guo, C., et al. (2016). "Myeloid-derived suppressor cells have a proinflammatory role in the pathogenesis of autoimmune arthritis." Ann. Rheum. Dis. 75: 278-285.

[121] Zhang, H., et al. (2015). "Myeloid-derived suppressor cells are proinflammatory and regulate collagen-induced arthritis through manipulating Th17 cell differentiation." Clin. Immunol. 157: 175-186.

[122] Brooks, R., et al. (2010). "SHIP1 inhibition increases immunoregulatory capacity and triggers apoptosis of hematopoietic cancer cells." J. Immunol. 184: 3582-3589.

[123] Fuhler, G. M., et al. (2012). "*Therapeutic potential of SH2 domain-containing inositol-5'-phosphatase 1 (SHIP1) and SHIP2 inhibition in cancer.*" Mol. Med. 18: 65-75.

[124] Gumbleton, M., et al. (2017). "*Dual enhancement of T and NK cell function by pulsatile inhibition of SHIP1 improves antitumor immunity and survival.*" Sci Signal 10(500): 1-9.

[125] Fujii, W., et al. (2013). "*Myeloid-derived suppressor cells play crucial roles in the regulation of mouse collagen-induced arthritis.*" J. Immunol. 191: 1073-1081.

[126] Wang, Y., et al. (2016). "*The potential therapeutic role of myeloid-derived suppressor cells in autoimmune arthritis.*" Semin. Arthritis Rheum. 45: 490-495.

[127] Wen, L., et al. (2016). "*Interplay between myeloid-derived suppressor cells (MDSCs) and Th17 cells: foe or friend?*" Oncotarget. 7: 35490-35496.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The foregoing written specification is considered to be sufficient to enable one skilled in the art to practice the present aspects and embodiments. The present aspects and embodiments are not to be limited in scope by examples provided, since the examples are intended as a single illustration of one aspect and other functionally equivalent embodiments are within the scope of the disclosure. Various modifications in addition to those shown and described herein will become apparent to those skilled in the art from the foregoing description and fall within the scope of the appended claims. The advantages and objects described herein are not necessarily encompassed by each embodiment. Those skilled in the art will recognize, or be able to ascertain using no more than routine experimentation, many equivalents to the specific embodiments described herein. Such equivalents are intended to be encompassed by the following claims.

What is claimed is:

1. A method of treating rheumatoid arthritis (RA) in a subject afflicted with RA, the method comprising the steps of:
   (1) obtaining the subject afflicted with RA;
   (2) obtaining PBMCs or BMMCs from the subject afflicted with RA;
   (3) culturing the PBMCs or BMMCs of the subject in the presence of a small molecule inhibitor of SHIP 1 comprising 3α-aminocholestane (3AC); and
   (4) administering intravenously to the subject a therapeutically effective number of myeloid derived suppressor cells (MDSCs) obtained from the PBMCs or BMMCs of the subject which have been cultured in the presence of the small molecule inhibitor of SHIP 1 comprising 3AC.

2. The method of claim 1, further comprising a step of administering 3α-aminocholestane (3AC) to the subject.

3. The method of claim 1, wherein step (3) further comprises culturing the PBMCs or BMMCs of the subject in the presence of Compound 26, Compound 27, Compound 28, K116, K118, K149, K161, or AS194490:

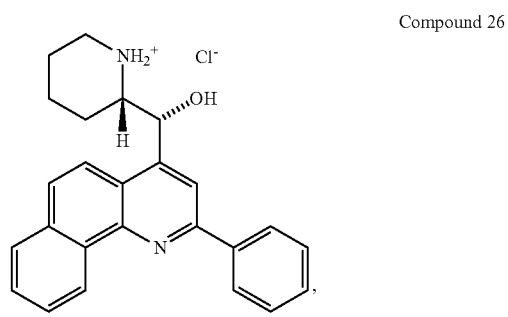

Compound 26

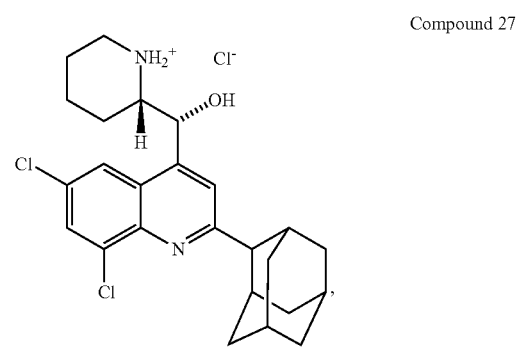

Compound 27

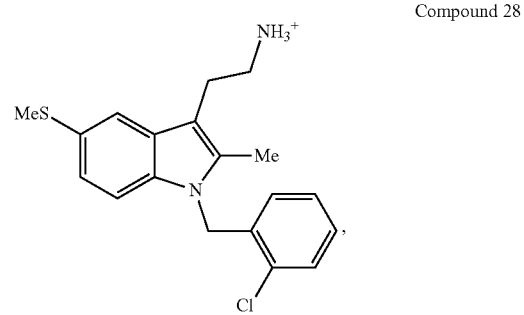

Compound 28

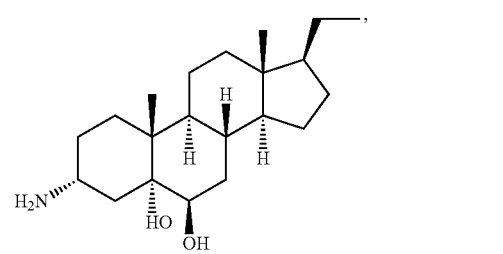

K116

37
-continued
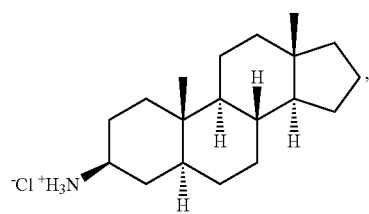
K118
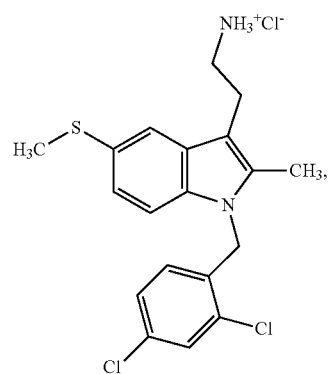
K149
38
-continued
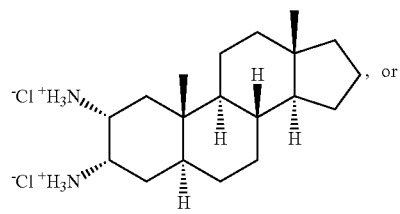
K161, or
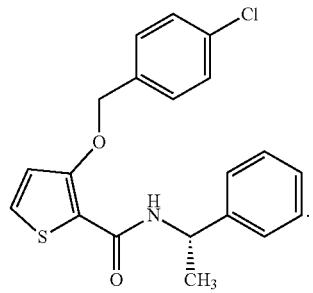
AS194490
* * * * *